US012120326B2

(12) United States Patent
Tian et al.

(10) Patent No.: US 12,120,326 B2
(45) Date of Patent: Oct. 15, 2024

(54) METHOD AND APPARATUS FOR ENCODING AND DECODING 3D VIDEO CONTENT

(75) Inventors: Dong Tian, Plainsboro, NJ (US); Po-Lin Lai, Princton, NJ (US); Jiancong Luo, West Windsor, NJ (US)

(73) Assignee: INTERDIGITAL MADISON PATENT HOLDINGS, Paris (FR)

( * ) Notice: Subject to any disclaimer, the term of this patent is extended or adjusted under 35 U.S.C. 154(b) by 942 days.

(21) Appl. No.: 13/138,459

(22) PCT Filed: Feb. 19, 2010

(86) PCT No.: PCT/US2010/000494
§ 371 (c)(1),
(2), (4) Date: Aug. 19, 2011

(87) PCT Pub. No.: WO2010/096189
PCT Pub. Date: Aug. 26, 2010

(65) Prior Publication Data
US 2011/0298895 A1    Dec. 8, 2011

Related U.S. Application Data

(60) Provisional application No. 61/208,013, filed on Feb. 19, 2009.

(51) Int. Cl.
*H04N 19/30* (2014.01)
*H04N 13/128* (2018.01)
(Continued)

(52) U.S. Cl.
CPC ........... *H04N 19/30* (2014.11); *H04N 13/128* (2018.05); *H04N 13/194* (2018.05); *H04N 19/46* (2014.11);
(Continued)

(58) Field of Classification Search
CPC .... H04N 13/0059; H04N 19/30; H04N 19/70; H04N 19/46; H04N 19/597;
(Continued)

(56) References Cited

U.S. PATENT DOCUMENTS 5,193,000 A    3/1993 Lipton et al.
5,915,091 A    6/1999 Ludwig et al.
(Continued)

FOREIGN PATENT DOCUMENTS

CN    1613263 A    5/2005
CN    1781315 A    5/2006
(Continued)

OTHER PUBLICATIONS

US 7,539,250 B2, 05/2009, Routhier et al. (withdrawn)
(Continued)

*Primary Examiner* — Richard A Hansell, Jr.
(74) *Attorney, Agent, or Firm* — Klintworth & Rozenblat IP LLP

(57) ABSTRACT

Several implementations relate to 3D video formats. One or more implementations provide adaptations to MVC and SVC to allow 3D video formats to be used. According to a general aspect, a set of images including video and depth is encoded. The set of images is related according to a particular 3D video format, and are encoded in a manner that exploits redundancy between the set of images. The encoded images are arranged in a bitstream in a particular order, based on the particular 3D video format that relates to the images. The particular order is indicated in the bitstream using signaling information. According to another general aspect, a bitstream is accessed that includes the encoded set of images. The signaling information is also accessed. The set of images is decoded using the signaling information.

30 Claims, 22 Drawing Sheets

(51) Int. Cl.
*H04N 13/194* (2018.01)
*H04N 19/46* (2014.01)
*H04N 19/597* (2014.01)
*H04N 19/70* (2014.01)

(52) U.S. Cl.
CPC ............ *H04N 19/597* (2014.11); *H04N 19/70* (2014.11); *H04N 2213/003* (2013.01)

(58) Field of Classification Search
CPC ......... H04N 13/0022; H04N 2213/003; H04N 13/128; H04N 13/194; H04N 13/139; H04N 13/172; H04N 21/236
See application file for complete search history.

(56) References Cited

U.S. PATENT DOCUMENTS

| | | | |
|---|---|---|---|
| 6,055,012 | A | 4/2000 | Haskell et al. |
| 6,157,396 | A * | 12/2000 | Margulis et al. ............. 345/506 |
| 6,173,087 | B1 | 1/2001 | Kumar et al. |
| 6,223,183 | B1 | 4/2001 | Smith et al. |
| 6,390,980 | B1 | 5/2002 | Peterson et al. |
| 7,254,264 | B2 | 8/2007 | Naske |
| 7,254,265 | B2 | 8/2007 | Naske et al. |
| 7,321,374 | B2 | 1/2008 | Naske |
| 7,391,811 | B2 | 6/2008 | Itoi et al. |
| 7,489,342 | B2 | 2/2009 | Xin et al. |
| 7,552,227 | B2 | 6/2009 | Wang |
| 8,139,142 | B2 | 3/2012 | Bamji et al. |
| 8,885,721 | B2 | 11/2014 | Tourapis et al. |
| 2003/0095177 | A1 | 5/2003 | Yun et al. |
| 2004/0028288 | A1 | 2/2004 | Edgar |
| 2004/0218668 | A1 | 11/2004 | Hannuksela et al. |
| 2005/0117637 | A1 | 6/2005 | Routhier et al. |
| 2005/0134731 | A1 | 6/2005 | Lee et al. |
| 2005/0243920 | A1 | 11/2005 | Murakami et al. |
| 2006/0176318 | A1 | 8/2006 | Martin et al. |
| 2006/0222254 | A1 | 10/2006 | Zandi et al. |
| 2006/0262856 | A1 | 11/2006 | Wu et al. |
| 2007/0030356 | A1 | 2/2007 | Yea et al. |
| 2007/0041633 | A1 | 2/2007 | Bhaskaran et al. |
| 2007/0121722 | A1 | 5/2007 | Martinian et al. |
| 2007/0153838 | A1 | 7/2007 | Pons et al. |
| 2007/0177813 | A1 | 8/2007 | Yang |
| 2007/0205367 | A1 | 9/2007 | Deman et al. |
| 2007/0211796 | A1 | 9/2007 | Kim |
| 2007/0229653 | A1 | 10/2007 | Matusik et al. |
| 2007/0269136 | A1 | 11/2007 | Naske |
| 2008/0095228 | A1 * | 4/2008 | Hannuksela ............ H04N 19/70 375/240.01 |
| 2008/0152241 | A1 | 6/2008 | Itoi et al. |
| 2008/0199091 | A1 | 8/2008 | Srinivasan et al. |
| 2008/0273592 | A1 | 11/2008 | Van Der Stok et al. |
| 2008/0284763 | A1 | 11/2008 | Someya et al. |
| 2008/0303895 | A1 | 12/2008 | Akka et al. |
| 2009/0002481 | A1 | 1/2009 | Kim |
| 2009/0092311 | A1 | 4/2009 | Kim et al. |
| 2009/0103616 | A1 * | 4/2009 | Ho et al. .................. 375/240.12 |
| 2009/0110007 | A1 * | 4/2009 | Li ................................. 370/537 |
| 2009/0195640 | A1 | 8/2009 | Kim et al. |
| 2009/0219282 | A1 * | 9/2009 | Kim et al. ..................... 345/419 |
| 2009/0225826 | A1 * | 9/2009 | Pandit ................. H04N 19/107 375/240.02 |
| 2010/0026712 | A1 * | 2/2010 | Aliprandi et al. ............. 345/629 |
| 2010/0046635 | A1 * | 2/2010 | Pandit ................. H04N 13/111 375/240.01 |
| 2010/0091881 | A1 * | 4/2010 | Pandit et al. ............ 375/240.25 |
| 2010/0165077 | A1 * | 7/2010 | Yin ...................... H04N 19/597 348/E13.001 |
| 2010/0195716 | A1 * | 8/2010 | Klein Gunnewiek ...................... H04N 19/597 375/240.08 |
| 2010/0303442 | A1 * | 12/2010 | Newton ................ H04N 13/359 386/241 |
| 2010/0309287 | A1 * | 12/2010 | Rodriguez ............. H04N 19/46 348/E13.001 |
| 2010/0310155 | A1 * | 12/2010 | Newton et al. ................ 382/154 |
| 2011/0122230 | A1 * | 5/2011 | Boisson ............... H04N 13/128 348/46 |
| 2011/0169823 | A1 * | 7/2011 | Barenburg ............ G06T 15/205 345/419 |
| 2011/0279645 | A1 * | 11/2011 | Newton ............... H04N 13/178 348/E13.001 |
| 2011/0298895 | A1 | 12/2011 | Tian et al. |
| 2012/0069154 | A1 * | 3/2012 | Talstra ................. H04N 13/161 348/51 |
| 2014/0341293 | A1 * | 11/2014 | Chen ...................... H04N 19/59 375/240.16 |

FOREIGN PATENT DOCUMENTS

| | | |
|---|---|---|
| CN | 101341758 A | 1/2009 |
| CN | 102326390 A | 1/2012 |
| DE | 19619598 | 11/1997 |
| EP | 1501318 | 1/2005 |
| EP | 1581003 | 9/2005 |
| EP | 1667448 | 6/2006 |
| EP | 1729521 | 12/2006 |
| EP | 2096870 | 9/2009 |
| EP | 2197217 | 6/2010 |
| JP | 2004048293 | 2/2004 |
| JP | 2007159111 | 6/2007 |
| JP | 2008034892 | 2/2008 |
| JP | 2009182953 | 8/2013 |
| KR | 20050055163 | 6/2005 |
| KR | 100535147 | 12/2005 |
| KR | 1020090102116 | 9/2009 |
| RU | 2006101400 | 6/2006 |
| RU | 2007103160 | 8/2008 |
| WO | WO1997043863 | 11/1997 |
| WO | WO9802844 | 1/1998 |
| WO | WO0225420 | 3/2002 |
| WO | 2003045046 A2 | 5/2003 |
| WO | 2004098194 A1 | 11/2004 |
| WO | WO2006001653 | 1/2006 |
| WO | WO2006041261 | 4/2006 |
| WO | WO2006137006 | 12/2006 |
| WO | WO2007046957 | 4/2007 |
| WO | WO2007047736 | 4/2007 |
| WO | 2007072397 A2 | 6/2007 |
| WO | WO2007081926 | 7/2007 |
| WO | WO2007096816 | 8/2007 |
| WO | WO2007126508 | 11/2007 |
| WO | WO2008024345 | 2/2008 |
| WO | 2008088497 A2 | 7/2008 |
| WO | WO2008127676 | 10/2008 |
| WO | WO-2008127676 A2 * | 10/2008 ............... G06T 3/00 |
| WO | WO2008140190 | 11/2008 |
| WO | WO2008150111 | 12/2008 |
| WO | WO2008156318 | 12/2008 |
| WO | WO2009040701 | 4/2009 |
| WO | WO-2009131287 A1 * | 10/2009 ........... H04N 19/176 |
| WO | WO2010011557 | 1/2010 |
| WO | WO-2010084439 A1 * | 7/2010 ........... H04N 13/139 |
| WO | WO-2010085361 A2 * | 7/2010 ............. H04N 19/44 |
| WO | 2010096189 A1 | 8/2010 |

OTHER PUBLICATIONS

Fehn et al., "An Evolutionary and Optimised Approach on 3D-TV", In Proceedings of International Broadcase Conference, vol. 2, pp. 357-365, Chicago, 2002.

Meessen et al., "Content Browsing and Semantic Context Viewing Through JPEG 2000-Based Scalable Video Summary," IEE Proceedings of Visual Image Signal Processing, vol. 153, No. 3, Jun. 2006, pp. 274-283.

Martinian et al., "Extensions of H.264/AVC for Multiview Video Compression", 2006 IEEE International Conference on Image Processing, Oct. 8, 2006, pp. 2981-2984.

(56) References Cited

OTHER PUBLICATIONS

Wimmer, "Stereoscopic Metadata Format Specification," Version 1.3, pp. 1-9, http:www.3dtv/atpffoce@3dtv.at, Linz, Austria, Jul. 8, 2006.
Wimmer, "Stereoscopic Movie Disk, 3DTV" Two Posters, Johannes Kepler University, Linz, Austria, Nov. 27-28, 2006.
Wimmer, "Stereoscopic Player and Stereomultiplexer," a Computer-Based System for Stereoscopic Video Playback and Recording, Johannes Kepler University, Linz, Austria, pp. 1-9, Nov. 27-28, 2006.
Wimmer, "Aufahme und Wiedergabe Stereokopischer Videos im Anwendungsbereich der Telkooperation," Linz, Austria, pp. 1-12, May 2004.
Costello, "Exif Orientation Tag (Feb. 17, 2002)", Internet article: http://web.archive.org/web/20022071400417/http://sylvana.net/jpegcrop/exif_orientation.html, 3 pages.
Pandit et al., "High Level Syntax changes for MVC", Joint Video Team (JVT) of ISO/IEC MPEG & ITU-T VCEG (ISO/IEC JTC1/SC29/WG11 and ITU-T SG16 Q.6), 22nd Mtg., Marrkech, Morocco, Jan. 13-19, 2006, Doc.: JVT- V054, pp. 1-10.
Wimmer, "DV/HDV Tape Drive Synchronization" Steroscopic Displays and Applications Conference, Jan. 29-31, 2007, San Jose, CA, pp. 1-20.
Tian et al., "On 2D + Depth SEI Message", International Organisation for Standardisation, ISO/IEC JTC1/SC29/ WG11, MPEG 2009/M16320, Maui, US, Apr. 2009.
International Telecommunication Union, Reply LS from ISO/IEC JTC 1/SC29/WG 11 on Video Coding Activities (COM16-LS-38), Study Group 16, Geneva, Oct. 26-Nov. 6, 2009, 2 pages.
Sullivan et al., "Coding of Moving Pictures and Audio Information", International Organisation for Standardisation, ISO/IEC JTC1/SC29/WG11N 10540, Maui, US, Apr. 2009.
Tourapis et al., "JVT of ISO/IEC MPEG & ITU-T VCEG, "Format Extensions to the Spatially Interleaved Pictures SEI Message, Document: JVT-AD022, Geneva, CH, Jan. 29-Feb. 3, 2009.
Yamakage et al., "Generalized SEI Message for Spatially Interleaved Pictures", JVT of ISO/IEC MPEG & ITU-T VCEG, Document: JVT-AD012, Geneva, CH, Jan. 29-Feb. 3, 2009, pp. 1-6.
Tian et al., "On Spatially Interleaved Pictures SEI Message", JVT of ISO/IEC MPEG & ITU-T VCEG, Document: JVT-AD017, Geneva, CH, Jan. 29-Feb. 3, 2009, pp. 1-11.
International Standard, "Information Technology—MPEG Video Technologies—Part 3: Representation of Auxiliary Video and Supplemental Information", ISO/IEC JTC 1/SC 29, Jan. 19, 2007.
Bruls et al., "Proposal to Amendment MPEG-C Part 3", International Organisation for Standardisation, ISO/IEC JTC1/SC29/WG11, Coding of Moving Pictures and Audio, Lausanne, Jul. 2007.
Fehn et al., "An Evolutionary and Optimised Approach on 3D-TV", Internet Citation, Sep. 14, 2002.
Fehn et al., "Study of Some MPEG Tools Related to 3D-Video", International Organisation for Standardisation, ISO/IEC JTC1/SC29/WG11, Fairfax, May 2002.
Pandit et al., "H.264/AVC Extension for MVC Using SEI Message", JVT of ISO/IEC MPEG & ITU-T VCEG, Document: JVT-X061, 24th Meeting: Geneva, Switzerland, Jun. 29-Jul. 6, 2007.
Hdmi Licensing, LLC, "3D Portion of the HDMI Specification Version 1.4", Press Release Jan. 26, 2011, 2 pages.
Li et al., "A Novel Multi-View Video Coding Scheme Based on H.264", ICICS-PCM 2003, Singapore, Dec. 15-18, 2003, pp. 493-497.
Murakami, "Adaptive Picture Flipping Coding", 16 Working Part, Jul. 26-Aug. 5, 2005, pp. 1-5.
De Bruyne et al., "Enhanced Shot-Based Video Adaptation Using MPEG-21 Generic Bitstream Syntax Schema", Proceedings of the 2007 IEEE Symposium on Computational Intelligence in Image and Signal Processing (CIISP 2007), pp. 380-385.
Standard of Japan Electronics and Information Technology Industries Association, "Exchangeable Image File Format for Digital Still Cameras: Exif Version 2.2," Technical Standardization Committee on AV & IT Storage Systems and Equipment, JEITA CP-3451, Apr. 2002.
Drose et al., "Extending Single View Scalable Video Coding to Multi-view Based on H.264/AVC," IEEE International Conference on Image Processing, Oct. 8-11, 2006, Atlanta, Georgia, 4 pages.
HDMI Licensing, LLC, "FAQ for HDMI 1.4", Feb. 18, 2011, pp. 1-6.
International Standard ISO/IEC 23002-3, "Information Technology—MPEG Video Technologies—Part 3: Representation of Auxiliary Video and Supplemental Information", First Edition Oct. 15, 2007, 34 pages.
Venuti, "Introducing HDMI 1.4 Specification Features", High Definition Multimedia Interface, HDMI Licensing, LLC, 2009, pp. 1-33.
Vetro et al., "Joint Draft 2.0 on Multiview Video Coding", JVT of ISO/IEC MPEG & ITU-T VCEG, Document: JVT- V209, 22nd Meeting: Marrakech, Morocco, Jan. 13-19, 2007, pp. 1-28.
Dickson, "NAB 2010: Grass Valley Unveils New Ignite Automation Product," Broadcasting and Cable, Apr. 12, 2010, 1 page.
Yan et al., "Region-Based Compression of Remote Sensing Stereo Image Pairs", Proceedings of SPIE, vol. 7455, 2009, pp. 1-13.
De Neve et al., "Using Bitstream Structure Descriptions for the Exploitation of Multi-Layered Temporal Scalability in H.264/AVC's Base Specification", PCM 2005, Part 1, LNCS 3767, Springer-Verlag, Berlin, Heidelberg, 2005, pp. 641-652.
Martinian et al., "View Synthesis for Multiview Video Compression", Mitsubishi Electric Research Laboratories, TR2006-035, May 2006, Picture Coding Symposium 2006, 8 pages.
Motorola, "3D Cinecast: A Curation About New Media Technologies," Overview of MPEG Standards for 3DTV, Apr. 21, 2010.
Vetro, "Frame Compatible Formats for 3D Video Distribution", TR2010-099, IEEE International Conference on Image Processing (ICIP), Nov. 2010, 6 pages.
Motorola, "Overview of MPEG Standards for 3DTV", White Paper, 2010, 4 pages.
Sullivan, et al., Constrained Baseline profile and supplemental enhancement information; Joint Video Team (JVT) of ISO/IEC MPEG & ITU-T VCEG, 29th Meeting, Busan, KR, Oct. 12-17, 2008.
Wimmer, "3dtv.at—Stereoscopic Player and Stereoscopic Multiplexer—S3D-Today," http://www.3dtv.at, Nov. 27-28, 2006, Munich, Germany, pp. 1-21.
Wimmer, "3dtv.at—Stereoscopic Movie Disk—S3D-Today," http://www.3dtv.at, Nov. 27-29, 2007, Munich, Germany, pp. 1-12.
Wimmer, "3dtv.at—DV/HDV Tape Drive Synchronization," Stereoscopic Displays and Applications Conference, Jan. 29-31, 2007, San Jose, US, pp. 1-20, http://www.3dtv.at.
"Chapter 13, MVC in H.264 /AVC (Multiview Video Coding) Standard", Revised 3rd Ed. H.264 AVC Textbook, pp. 305-323, Jan. 2009.
Wimmer, Peter, et al., "Stereoscopic Multiplexer: A Real-Time 3-D Multiplexing Software", Feb. 15, 2009.
Wimmer, Peter, et al., "Stereoscopic Player: A Versatile 3-D Video Playback Software", Feb. 15, 2009.
Bruls, F., et al. "International Organisation for Standardisation Organisation Internationale De Normalisation ISO/IEC JTC1/SC29/WG 11 Coding of Moving Pictures and Audio" ISO/IEC JTC1/SC29/WG11 (2009).

\* cited by examiner

METHOD AND APPARATUS FOR ENCODING AND DECODING 3D VIDEO CONTENT

CROSS-REFERENCE TO RELATED APPLICATIONS

This application is a national stage application under 35 U.S.C. § 371 of International Application PCT/US2010/000494, filed Feb. 19, 2010, which was published in accordance with PCT Article 21(2) on Aug. 26, 2010, in English and which claims the benefit of U.S. provisional patent application No. 61/208,013, filed Feb. 19, 2009.

TECHNICAL FIELD

Implementations are described that relate to coding systems. Various particular implementations relate to three-dimensional (3D) video formats.

BACKGROUND

To facilitate new video applications such as three-dimensional television (3DTV) and free-viewpoint video (FVV), 3D Video (3DV) data formats that include both conventional two-dimensional (2D) video and depth can be utilized such that additional video views can be rendered at the user end. Examples of such 3DV formats include 2D plus depth (2D+Z) (which include a 2D video and the corresponding depth map) and layered depth video (LDV) (which includes data in 2D+Z plus one occlusion video and one occlusion depth). Multi-view plus depth (MVD) is an extension of 2D+Z which consists of multiple 2D+Z from different viewpoints. Disparity enhanced stereo (DES) is another format which is equivalent to two LDV from two different views. How to convey (encode and transmit) these data formats is an important issue as different components have to be used jointly at the user end.

SUMMARY

According to a general aspect, a set of images is encoded. The set of images includes a video image and a depth image corresponding to the video image. The images in the set of images are related according to a particular 3D video format. The set of images being encoded in a manner that exploits redundancy between images in the set of images. The encoded images are arranged in a bitstream in a particular order, based on the particular 3D video format that relates to the images. The particular order is indicated in the bitstream using signaling information.

According to another general aspect, a bitstream is accessed that includes an encoded set of images, the set of images including a video image and a depth image corresponding to the video image. The set of images is related according to a particular 3D video format. The set of images is encoded in a manner that exploits redundancy between images in the set of images. Signaling information is accessed that indicates a particular order in which the encoded set of images are arranged in the bitstream. The particular order is based on the particular 3D video format that relates to the set of images. The set of images is decoded using the signaling information.

According to another general aspect, a video signal is formatted to include information. The video signal includes a signaling section that includes signaling information. The signaling information indicates a particular order in which an encoded set of images are arranged in a bitstream. The particular order is based on a particular 3D video format that relates to the set of images.

The details of one or more implementations are set forth in the accompanying drawings and the description below. Even if described in one particular manner, it should be clear that implementations may be configured or embodied in various manners. For example, an implementation may be performed as a method, or embodied as apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

DETAILED DESCRIPTION

3DV data formats such as those that include both conventional 2D video and depth can be utilized such that, for example, additional video views can be rendered at the user end. However, the inventors have determined that a drawback exists in that 3DV formats are not currently supported in current standards, such as scalable video coding (SVC) and multi-view video coding (MVC). A multi-view video sequence is a set of two or more video sequences that capture the same scene from different viewpoints.

Thus, in at least one implementation, we propose to reuse existing MVC or SVC extensions to advanced video coding (AVC) to transmit the 3DV contents with the help of signaling how to extract the 3DV content correctly. The signaling can be done at any high level syntax including, but not limited to, for example, the sequence parameter set (SPS), the picture parameter set (PPS), the slice header, a supplemental enhancement information (SEI) message, and so forth. Other signaling schemes are also possible and are contemplated in this application.

In at least one implementation, we propose to use the framework of SVC or MVC to code the 3DV components without requiring synchronization at the system level. Using the techniques in SVC or MVC, the present principles can exploit cross-component redundancy more efficiently. Furthermore, the backward compatibility is more flexible as conventional 2D video can be transmitted/decoded with only part of the entire bitstream (e.g., the base layer for SVC, or the base view in MVC).

In at least one implementation, we further propose to use high level syntax to signal how to understand the views (in MVC) or layers (in SVC) in the context of 3DV such that a 3D display can use the information correctly.

In at least one implementation, we propose a "3DV format SEI message" in the framework of MVC and SVC for signaling various 3DV formats. Such an implementation may have one or more, and possibly all, of the following advantages:
  Avoiding the need for synchronization for different components in the system level, as they will be associated in a layered fashion (SVC) or in simultaneous views (MVC).
  Better exploitation of cross-component redundancy: cross-component predictions will be enabled by SVC/MVC which can potentially provide higher coding efficiency as compared to AVC with interleaving methods.
  Backward compatibility with better flexibility: only partial data is required for conventional 2D video applications at the user end.

It is to be appreciated that while at least one implementation involves an SEI message, the present principles as noted above are not limited to the use of an SEI message. Thus, for example, other high levels syntax including, but not limited to, the SPS, the PPS, the slice header, and so forth.

Figure 1:
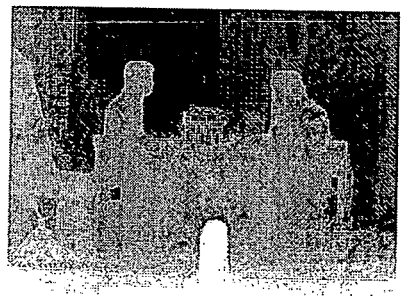
FIG. 1 is an example of a depth map.
Figure 2:
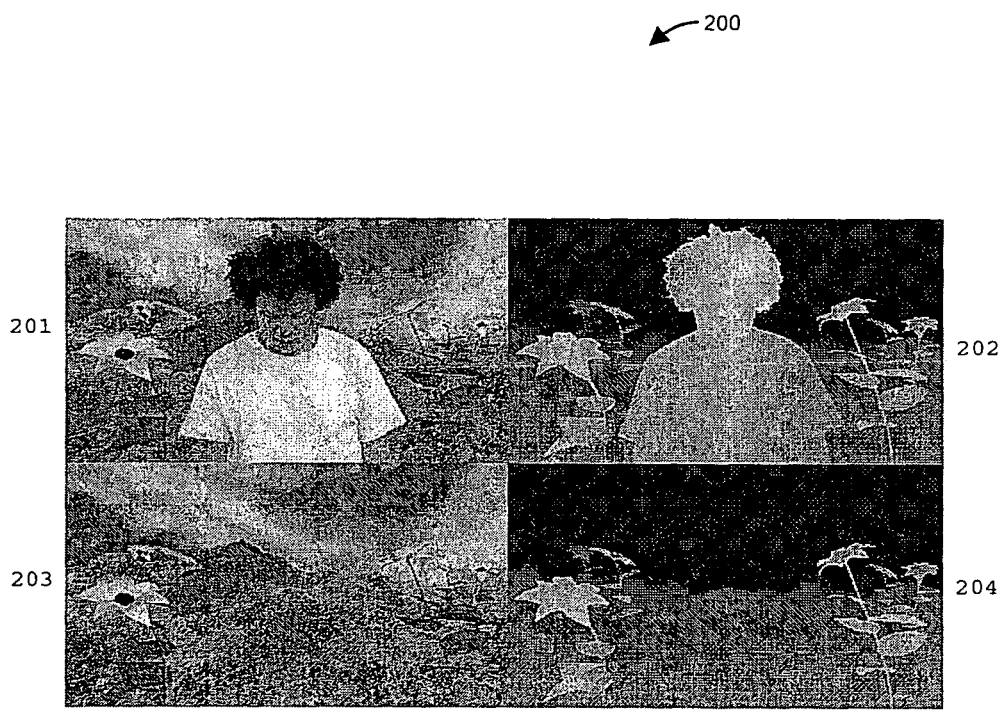
FIG. 2 is an example showing the four components of the LDV format.

3D Video (3DV) representation formats include both video and depth components, such as 2D+Z (MVD) and LDV (DES), which become increasingly important as 3DV applications attract more market interest. FIG. 1 shows an exemplary depth map 100 corresponding to an MPEG test sequence known as "Leaving_Laptop", to which the present principles may be applied in accordance with an embodiment of the present principles. FIG. 2 shows the four components in the LDV format, to which the present principles may be applied in accordance with an embodiment of the present principles. In particular, the upper left portion 201 shows a 2D video view, the upper right portion 202 shows depth, the lower left portion 203 shows the occlusion video layer, and the lower right portion 204 shows the occlusion depth layer. Encoding and transmission of the above data formats are essential to various applications as well as challenging. Besides coding efficiency, functionalities such as synchronization and backward compatibility (for conventional monoscopic 2D video) should be considered such that a legacy decoder can show something from the bitstream.

A relatively straightforward solution is simulcast, in which each component is encoded and transmitted independently. Typical implementations of this approach require multiple encoders/decoders and synchronization at the system level or the application level. In other words, the cost of simulcast may be simply multiplied by the number of 3DV components. Furthermore, since different components are encoded separately, any redundancy among components will not be exploited.

MPEG-C Part 3 (ISO/IEC 23002-3) specifies a system framework for 2D+Z. MPEG-C Part 3 also requires synchronization at the system level between the video and depth. The video and depth can be coded using any existing video coding standard, however, the encoding of the video and depth are decoupled and no coding benefit is obtained between the two components. The LDV (DES) format is not specified in MPEG-C Part 3. The coding solutions for 2D+Z (MVD) and LDV (DES) are still under exploration, for example within the 3DV group of MPEG.

To incorporate 2D+Z (MVD) and LDV (DES) formats into existing coding schemes such as SVC and MVC, in at least one implementation we propose to utilize some high level syntax to signal how the 3DV components can be extracted from the SVC or MVC bitstreams. This approach has the advantage that there is no need for synchronization between different 3DV components at the system level, as they will be coupled in the coded bitstream (such as base/enhancement layers in SVC, or as different views in MVC). Another potential benefit is that the cross-component redundancy can be removed when encoding is performed in this manner.

Terminology:

A "3DV view" is defined herein as a data set from one view position, which is different from the "view" used in MVC. For the 2D+Z format, a 3DV view includes two component sequences, namely a 2D view plus its depth map. For the LDV format, a 3DV view includes four component sequences, namely a 2D view, a depth map, an occlusion view, and an occlusion depth map.

When an MVC (SVC) decoder receives a bitstream including the proposed SEI messages, the MVC (SVC) decoder can compose the 3DV data in a way that a 3D display can output proper images.

Figure 3:
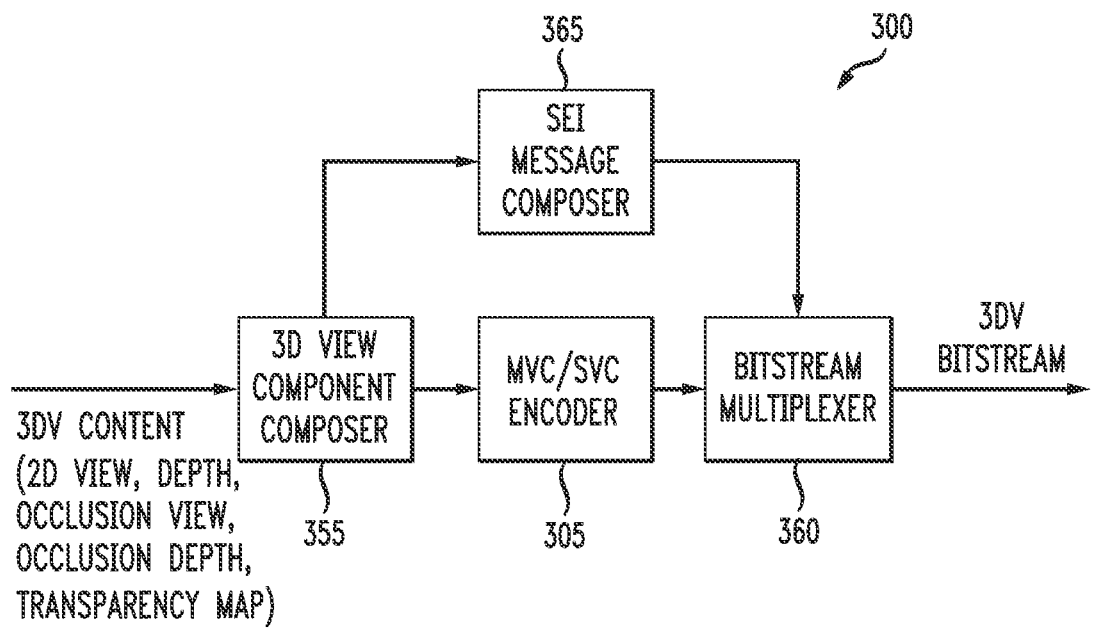
FIG. 3 is a diagram of an implementation of a 3DV encoder.

FIG. 3 is a diagram of an implementation of a 3DV encoder 300 to which the present principles may be applied, in accordance with an embodiment of the present principles. The encoder 300 includes a 3D view component composer 355 having a first output in signal communication with an input of an MVC/SVC encoder 305. An output of the MVC/SVC encoder 305 is connected in signal communication with a first input of a bitstream multiplexer 360. A second output of the 3D view component composer 355 is connected in signal communication with a first input of an SEI message composer 365. An output of the SEI message composer 365 is connected in signal communication with a second input of the bitstream multiplexer 360. An input of the 3D view component composer 355 is available as an input of the encoder 300, for receiving 3DV content (e.g., a 2D view(s), depth, an occlusion view(s), occlusion depth, a transparency map(s), etc.). An output of the bitstream multiplexer 360 is available as an output of the encoder 300, for outputting a 3DV bitstream.

With this implementation, each 3DV component encoder (not shown) within the MVC/SVC encoder 305 is an MVC encoder or an SVC encoder. In the case that an MVC encoder is used, each 3DV component encoder is an MVC encoder for one MVC view. In the case that an SVC encoder is used, each 3DV component encoder is an SVC decoder for one SVC layer. The 3D view component composer 355 is a dispatcher to send 3DV components to MVC views or SVC layers and send such control information to the SEI message composer 365. The SEI message composer 365 will compose an SEI message to signal in the bitstream. The bitstream multiplexer 360 will multiplex the bitstream.

Figure 4:
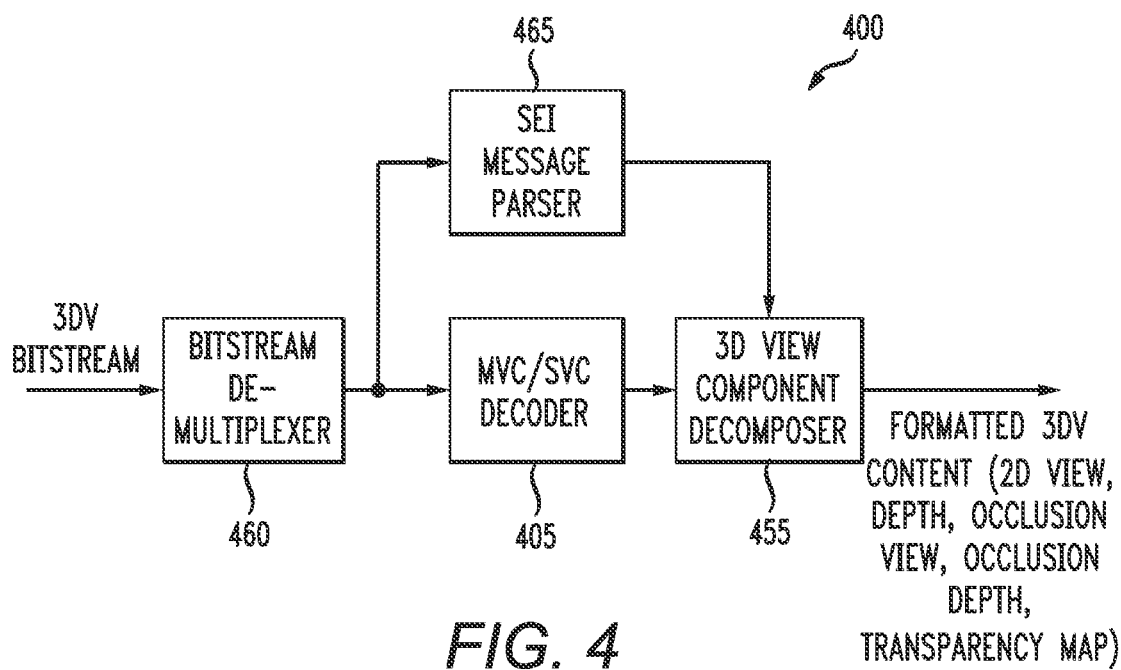
FIG. 4 is a diagram of an implementation of a 3DV decoder.

FIG. 4 is a diagram of an implementation of a 3DV decoder 400 to which the present principles may be applied, in accordance with an embodiment of the present principles. The decoder 400 includes a bitstream de-multiplexer 460 having an output connected in signal communication with an input of an SEI message parser 465 and an input of an MVC/SVC decoder 405. An output of the SEI message parser 465 is connected in signal communication with a first input of a 3D view component decomposer 455. An output of the MVC/SVC decoder 405 is connected in signal communication with a second input of the 3D view component decomposer 455. An input of the bitstream de-multiplexer 460 is available as an input of the decoder 400, for receiving a 3DV bitstream. An output of the 3D view component decomposer 455 is available as an output of the decoder 400, for outputting formatted 3DV content (e.g., a 2D view(s), depth, an occlusion view(s), occlusion depth, a transparency map(s), etc.).

FIGS. 3 and 4 show particular implementations, but other implementations are contemplated. For example, another implementation does not have separate inputs on one or more of the blocks of FIG. 3 (or FIG. 4). Rather, a single input is used to receive multiple signals. As a specific example, bitstream multiplexer 360 may have only a single input. The single input receives the output from the MVC/SVC encoder 305 as well as the output from the SEI message composer 365. Further, another implementation of the 3D view component composer 355 only has a single output that provides both the signal to the SEI message composer 365 and the signal to the MVC/SVC encoder 305. Similar adaptations are contemplated for the implementation of FIG. 4, as well as other figures and implementations described throughout this application.

Figure 5:
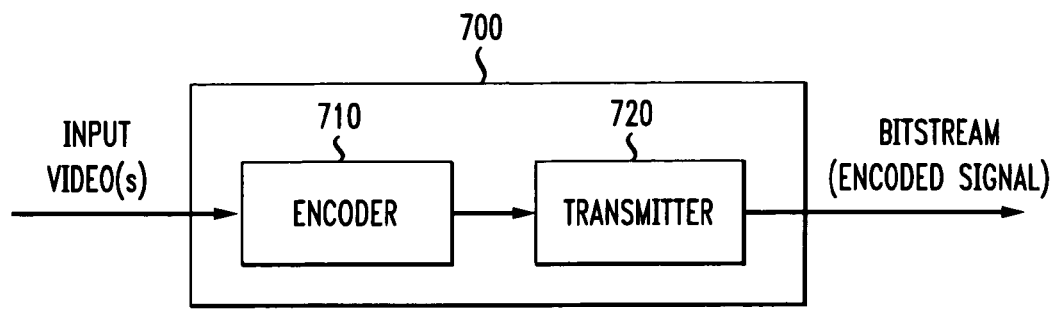
FIG. 5 is a diagram of an implementation of a video transmission system.

FIG. 5 shows an exemplary video transmission system 700, to which the present principles may be applied, in accordance with an implementation of the present principles. The video transmission system 700 may be, for example, a head-end or transmission system for transmitting a signal using any of a variety of media, such as, for example, satellite, cable, telephone-line, or terrestrial broadcast. The transmission may be provided over the Internet or some other network.

The video transmission system 700 is capable of generating and delivering, for example, video content and depth. This is achieved by generating an encoded signal(s) including depth information or information capable of being used to synthesize the depth information at a receiver end that may, for example, have a decoder.

The video transmission system 700 includes an encoder 710 and a transmitter 720 capable of transmitting the encoded signal. The encoder 710 receives video information and generates an encoded signal(s) based on the video information and/or depth information. The encoder 710 may be, for example, the encoder 300 described in detail above. The encoder 710 may include sub-modules, including for example an assembly unit for receiving and assembling various pieces of information into a structured format for storage or transmission. The various pieces of information may include, for example, coded or uncoded video, coded or uncoded depth information, and coded or uncoded elements such as, for example, motion vectors, coding mode indicators, and syntax elements.

The transmitter 720 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers. The transmitter may include, or interface with, an antenna (not shown). Accordingly, implementations of the transmitter 720 may include, or be limited to, a modulator.

Figure 6:
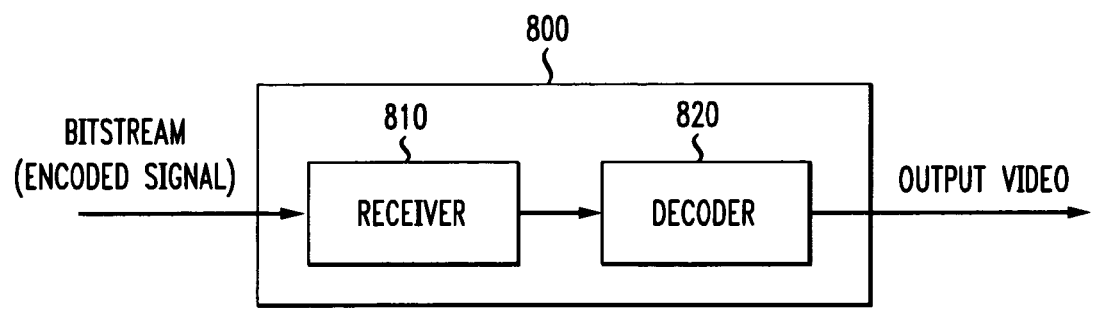
FIG. 6 is a diagram of an implementation of a video receiving system.

FIG. 6 shows an exemplary video receiving system 800 to which the present principles may be applied, in accordance with an embodiment of the present principles. The video receiving system 800 may be configured to receive signals over a variety of media, such as, for example, satellite, cable, telephone-line, or terrestrial broadcast. The signals may be received over the Internet or some other network.

The video receiving system 800 may be, for example, a cell-phone, a computer, a set-top box, a television, or other device that receives encoded video and provides, for example, decoded video for display to a user or for storage. Thus, the video receiving system 800 may provide its output to, for example, a screen of a television, a computer monitor, a computer (for storage, processing, or display), or some other storage, processing, or display device.

The video receiving system 800 is capable of receiving and processing video content including video information. The video receiving system 800 includes a receiver 810 capable of receiving an encoded signal, such as for example the signals described in the implementations of this application, and a decoder 820 capable of decoding the received signal.

The receiver 810 may be, for example, adapted to receive a program signal having a plurality of bitstreams representing encoded pictures. Typical receivers perform functions such as, for example, one or more of receiving a modulated and encoded data signal, demodulating the data signal from one or more carriers, de-randomizing the energy in the signal, de-interleaving the data in the signal, and error-correction decoding the signal. The receiver 810 may include, or interface with, an antenna (not shown). Implementations of the receiver 810 may include, or be limited to, a demodulator.

The decoder 820 outputs video signals including video information and depth information. The decoder 820 may be, for example, the decoder 400 described in detail above.

Figure 7:
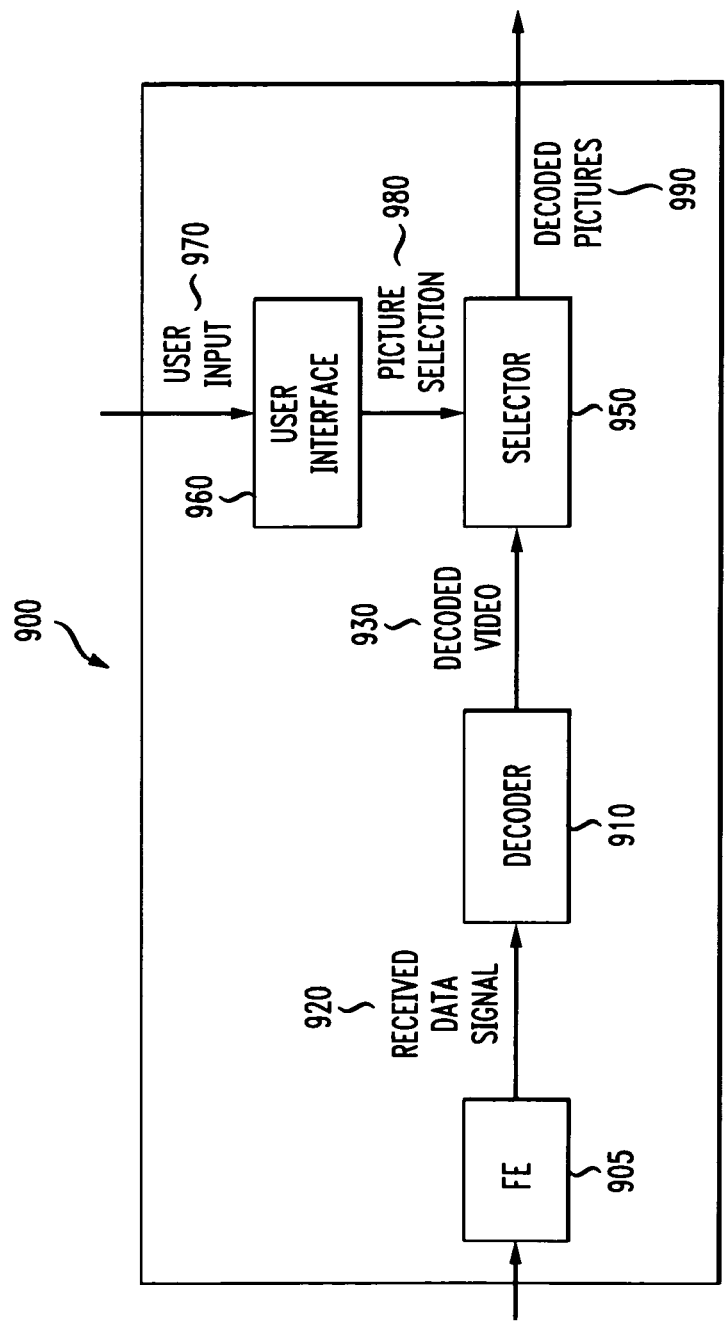
FIG. 7 is a diagram of an implementation of a video processing device.

FIG. 7 shows an exemplary video processing device 900 to which the present principles may be applied, in accordance with an embodiment of the present principles. The video processing device 900 may be, for example, a set top box or other device that receives encoded video and provides, for example, decoded video for display to a user or for storage. Thus, the video processing device 900 may provide its output to a television, computer monitor, or a computer or other processing device.

The video processing device 900 includes a front-end (FE) device 905 and a decoder 910. The front-end device 905 may be, for example, a receiver adapted to receive a program signal having a plurality of bitstreams representing encoded pictures, and to select one or more bitstreams for decoding from the plurality of bitstreams. Typical receivers perform functions such as, for example, one or more of receiving a modulated and encoded data signal, demodulating the data signal, decoding one or more encodings (for example, channel coding and/or source coding) of the data signal, and/or error-correcting the data signal. The front-end device 905 may receive the program signal from, for example, an antenna (not shown). The front-end device 905 provides a received data signal to the decoder 910.

The decoder 910 receives a data signal 920. The data signal 920 may include, for example, one or more Advanced Video Coding (AVC), Scalable Video Coding (SVC), or Multi-view Video Coding (MVC) compatible streams.

AVC refers more specifically to the existing International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "H.264/MPEG-4 AVC Standard" or variations thereof, such as the "AVC standard" or simply "AVC").

MVC refers more specifically to a multi-view video coding ("MVC") extension (Annex H) of the AVC standard, referred to as H.264/MPEG-4 AVC, MVC extension (the "MVC extension" or simply "MVC").

SVC refers more specifically to a scalable video coding ("SVC") extension (Annex G) of the AVC standard, referred to as H.264/MPEG-4 AVC, SVC extension (the "SVC extension" or simply "SVC").

The decoder 910 decodes all or part of the received signal 920 and provides as output a decoded video signal 930. The decoded video 930 is provided to a selector 950. The device 900 also includes a user interface 960 that receives a user input 970. The user interface 960 provides a picture selection signal 980, based on the user input 970, to the selector 950. The picture selection signal 980 and the user input 970 indicate which of multiple pictures, sequences, scalable versions, views, or other selections of the available decoded data a user desires to have displayed. The selector 950 provides the selected picture(s) as an output 990. The selector 950 uses the picture selection information 980 to select which of the pictures in the decoded video 930 to provide as the output 990.

In various implementations, the selector 950 includes the user interface 960, and in other implementations no user interface 960 is needed because the selector 950 receives the user input 970 directly without a separate interface function being performed. The selector 950 may be implemented in software or as an integrated circuit, for example. In one implementation, the selector 950 is incorporated with the decoder 910, and in another implementation, the decoder 910, the selector 950, and the user interface 960 are all integrated.

In one application, front-end 905 receives a broadcast of various television shows and selects one for processing. The selection of one show is based on user input of a desired channel to watch. Although the user input to front-end device 905 is not shown in FIG. 7, front-end device 905 receives the user input 970. The front-end 905 receives the broadcast and processes the desired show by demodulating the relevant part of the broadcast spectrum, and decoding any outer encoding of the demodulated show. The front-end 905 provides the decoded show to the decoder 910. The decoder 910 is an integrated unit that includes devices 960 and 950. The decoder 910 thus receives the user input, which is a user-supplied indication of a desired view to watch in the show. The decoder 910 decodes the selected view, as well as any required reference pictures from other views, and provides the decoded view 990 for display on a television (not shown).

Continuing the above application, the user may desire to switch the view that is displayed and may then provide a new input to the decoder 910. After receiving a "view change" from the user, the decoder 910 decodes both the old view and the new view, as well as any views that are in between the old view and the new view. That is, the decoder 910 decodes any views that are taken from cameras that are physically located in between the camera taking the old view and the camera taking the new view. The front-end device 905 also receives the information identifying the old view, the new view, and the views in between. Such information may be provided, for example, by a controller (not shown in FIG. 7) having information about the locations of the views, or the decoder 910. Other implementations may use a front-end device that has a controller integrated with the front-end device.

The decoder 910 provides all of these decoded views as output 990. A post-processor (not shown in FIG. 7) interpolates between the views to provide a smooth transition from the old view to the new view, and displays this transition to the user. After transitioning to the new view, the post-processor informs (through one or more communication links not shown) the decoder 910 and the front-end device 905 that only the new view is needed. Thereafter, the decoder 910 only provides as output 990 the new view.

The system 900 may be used to receive multiple views of a sequence of images, and to present a single view for display, and to switch between the various views in a smooth manner. The smooth manner may involve interpolating between views to move to another view. Additionally, the system 900 may allow a user to rotate an object or scene, or otherwise to see a three-dimensional representation of an object or a scene. The rotation of the object, for example, may correspond to moving from view to view, and interpolating between the views to obtain a smooth transition between the views or simply to obtain a three-dimensional representation. That is, the user may "select" an interpolated view as the "view" that is to be displayed.

It should be clear that the video transmission system 700, the video receiving system 800, and the video processing device 900, may all be adapted for use with the various implementations described in this application. For example, systems 700, 800, and 900, may be adapted to operate with data in one of the 3DV formats discussed, as well as with the associated signaling information.

Embodiment 1

3DV Format SEI Message for MVC

In the framework of MVC, 3DV component sequences are encoded as different "views". Thus, the cross-component redundancy can be removed by inter-view prediction which is a feature of MVC. For example, the redundancy between the 2D view and occlusion views could be removed efficiently. TABLE 1 shows the proposed syntax for a 3DV format SEI message for MVC pertaining to Embodiment 1. Note that the MVC bitstream may include more views other than the 3DV component sequences in this embodiment.

TABLE 1

| | Descriptor |
|---|---|
| three_dv_format( payloadSize ) { | |
|   three_dv_format_id | ue(v) |
|   three_dv_format_cancel_flag | u(1) |
|   if( !three_dv_format_cancel_flag ) { | |
|     num_three_dv_view_minus1 | ue(v) |
|     basic_three_dv_format_type_id | ue(v) |
|     for( 3dv_view_id = 0; 3dv_view_id <= num_three_dv_view_minus1; 3dv_view_id ++) { | |
|       if (3dv_view_id != 0) | |
|         video_present_flag[3dv_view_id] | u(1) |
|       else | |
|         video_present_flag[3dv_view_id] = 1 | |
|       if (video_present_flag[3dv_view_id]) | |
|         video_id[3dv_view_id] | u(10) |
|       depth_present_flag[3dv_view_id] | u(1) |
|       if (depth_present_flag[3dv_view_id]) | |
|         depth_id[3dv_view_id] | u(10) |
|       if (basic_three_dv_format_type_id == 1) | |
|         occlusion_video_present_flag[3dv_view_id] | u(1) |
|       else | |
|         occlusion_video_present_flag[3dv_view_id] = 0 | |
|       if (occlusion_video_present_flag[3dv_view_id]) | |
|         occlusion_video_id[3dv_view_id] | u(10) |
|       if (basic_three_dv_format_type_id == 1) | |
|         occlusion_depth_present_flag | u(1) |
|       else | |
|         occlusion_depth_present_flag = 0 | |
|       if (occlusion_depth_present_flag == 1) | |
|         occlusion_depth_id[3dv_view_id] | u(10) |
|     } | |
|     three_dv_format_repetition_period | ue(v) |
|   } | |
|   additional_extension_flag | u(1) |
| } | |

The semantics of the syntax elements of TABLE 1 are as follows.

three_dv_format_id includes an identifying number that may be used to identify the usage of the 3DV format SEI message. The value shall be in the range of 0 to $2^{32}-2$, inclusive. It is to be noted that values from 0 to 255 and from 512 to $2^{31}-1$ may be used as determined by the application. Values from 256 to 511 and from $2^{31}$ to $2^{32}-2$ are reserved for future use. Decoders shall ignore (remove from the bitstream and discard) all 3DV format SEI messages including a value of three_dv_format_id in the range of 256 to 511 or in the range of $2^{31}$ to $2^{32}-2$, and bitstreams shall not include such values.

three_dv_format_cancel_flag equal to 1 indicates that the 3DV format SEI message cancels the persistence of any previous 3DV format SEI message in output order. three_dv_ format_cancel_flag equal to 0 indicates that 3DV format information follows.

num_three_dv_view_minus1 plus 1 indicates the number of views which have 3DV data. Each view has an unique ID number in the context of the 3DV format, 3dv_view_id, ranging from 0 to num_three_dv_view_minus1, inclusive. It is to be noted that 3dv_view_id is different from view_id in the context of MVC. For 3DV data from one view, such as a 2D view, its depth map and so forth are treated as different views in MVC and have different view_id's but share the same 3dv_view_id since they correspond to different component sequences of the same view position.

basic_three_dv_format_type_id indicates the basic 3DV format type included in the MVC bitstream. 3DV format can be of two types: 2D+Z; or LDV. The 2D+Z format includes a 2D view plus its depth map from one view position. The LDV format includes a 2D view, its depth map, an occlusion view, and an occlusion depth map from one view position.

basic_three_ dv_format_type_id equal to 0 indicates that the MVC bitstream includes (num_three_dv_view_minus1+ 1) sets of 2D+Z data. Each data set corresponds to one view position. num_three_dv_view_minus1 equal to 0 stands for the 2D+Z format. num_three_dv_view_minus1 equal to or greater than 1 stands for the MVD format.

basic_three_dv_format_type_id equal to 1 indicates that the MVC bitstream includes (num_three_dv_view_minus1+ 1) sets of LDV data. Each data set corresponds to one view position. num_three_dv_view_minus1 equal to 0 stands for the LDV format. num_three_dv_view_minus1 equal to 1 stands for the DES format. It is to be noted that values greater than 1 are not allowed.

video_present_flag[3dv_view_id] indicates whether the 2D video component is present for the current 3D view. A value of 1 indicates the presence of the 2D view component. A value of 0 indicates the absence of the 2D view component.

video_id[3dv_view_id] indicates the view_id in the MVC bitstream which corresponds to the 3DV view with 3dv_view_id. A value of −1 indicates that no 2D view component for the 3DV view is available in the bitstream.

depth_present_flag[3dv_view_id] indicates whether the depth map component is present for the current 3D view. A value of 1 indicates the presence of the depth map component. A value of 0 indicates the absence of the depth map component.

depth_id[3dv_view_id] indicates the view_id in the MVC bitstream which corresponds to the 3DV depth component with 3dv_view_id. A value of −1 indicates that no depth component for the 3DV view is available in the bitstream.

occlusion_video_present_flag[3dv_view_id] indicates whether the occlusion video component is present for the current 3D view. A value of 1 indicates the presence of the occlusion video component. A value of 0 indicates the absence of the occlusion video component.

occlusion_video_id[3dv_view_id] indicates the view_id in the MVC bitstream which corresponds to the occlusion video component with 3dv_view_id. A value of −1 indicates that no occlusion video component for the 3DV view is available in the bitstream.

occlusion_depth_present_flag[3dv_view_id] indicates whether the occlusion depth component is present for the current 3D view. A value of 1 indicates the presence of the occlusion depth component. A value of 0 indicates the absence of the occlusion depth component.

occlusion_depth_id[3dv_view_id] indicates the view_id in the MVC bitstream which corresponds to the occlusion depth component with 3dv_view_id. A value of −1 indicates that no occlusion depth component for the 3DV view is available in the bitstream.

three_dv_format_repetition_period specifies the persistence of the 3DV format SEI message and may specify a picture order count interval within which another 3DV format SEI with the same value of three_dv_format_id or may specify that the end of the coded video sequence is present in the bitstream. Thus, this syntax specifies the time range when the SEI is valid. One exemplary implementation involves the use of the POC (picture order count) interval. POC can be understood as an index of frames being coded, which is ascending with increasing display time. The value of three_dv_format_repetition_period shall be in the range of 0 to 16384, inclusive. three_dvformat_repetition_period equal to 0 specifies that the 3DV format SEI message applies to the current decoded picture only.

three_dv_format_repetition_period equal to 1 specifies that the 3DV format SEI message persists in output order until any of the following conditions are true:
  A new coded video sequence begins.
  A picture in an access unit including a 3DV format SEI message with the same value of three_dv_format_id is output having PicOrderCnt( ) greater than PicOrderCnt (CurrPic).

three_dv_format_repetition_period equal to 0 or equal to 1 indicates that another 3DV format SEI message with the same value of three_dv_format_id may or may not be present. three_dv_format_repetition_period greater than 1 specifies that the 3DV format SEI message persists until any of the following conditions are true:
  A new coded video sequence begins.
  A picture in an access unit including a 3DV format SEI message with the same value of three_dv_format_id is output having PicOrderCnt( ) greater than PicOrderCnt (CurrPic) and less than or equal to PicOrderCnt (CurrPic)+three_dv_format_repetition_period.

three_dv_format_repetition_period greater than 1 indicates that another 3DV format SEI message with the same value of three_dv_format_id shall be present for a picture in an access unit that is output having PicOrderCnt( ) greater than PicOrderCnt(CurrPic) and less than or equal to PicOrderCnt(CurrPic)+three_dv_format_repetition_period, unless the bitstream ends or a new coded video sequence begins without output of such a picture.

additional_extension_flag equal to 0 indicates that no additional data follows within the 3DV format SEI message. The value of additional_extension_flag shall be equal to 0. A value of 1 for additional_extension_flag is reserved for future use by ITU-T and ISO/IEC. Decoders that conform to the H.264 Standard shall ignore all data that follows the value of 1 for additional_extension_flag in a spatially interleaved pictures SEI message.

Three examples are given below.

Example 1

Figure 8:
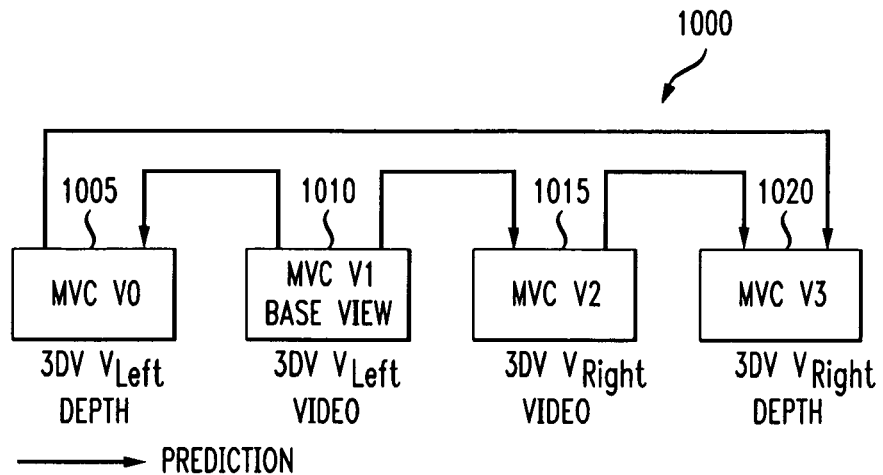
FIG. 8 is a diagram showing an example of encoding the MVD format in the MVC structure.

FIG. 8 is a diagram showing an example 1000 of encoding the MVD format in the MVC structure. There are two 3DV views in this example. 3dv_view_id of the left view is 0 and 3dv_view_id of the right view is 1. The left view is treated as the base view, which can be decoded by an AVC compatible decoder. view_id of the left view 1010 is 1. view_id of the left depth 1005, right view 1015, and right depth 1020 are 0, 2, and 3, respectively. TABLE 2 shows an MVD example of a 3DV SEI message for MVC corresponding to Example 1 of Embodiment 1.

TABLE 2

|  | Descriptor |
|---|---|
| three_dv_format( payloadSize ) { |  |
|   three_dv_format_id = 0 | ue(v) |
|   three_dv_format_cancel_flag = 0 | u(1) |
|   num_three_dv_view_minus1 = 1 | ue(v) |
|   basic_three_dv_format_type_id = 0 | ue(v) |
|     video_id[0] = 1 | u(10) |
|     depth_present_flag[0] = 1 | u(1) |
|     depth_id[0] = 0 | u(10) |
|     video_present_flag[1] = 1 | u(1) |
|     video_id[1] = 2 | u(10) |
|     depth_present_flag[1] = 1 | u(1) |
|     depth_id[1] = 3 | u(10) |
|   three_dv_format_repetition_period = 1 | ue(v) |
|   additional_extension_flag = 0 | u(1) |
| } |  |

Note that the view dependency information as shown in FIG. 8 is signaled through the SPS extension for H.264 Annex H (also known as the MVC extension of H.264 or simply the MVC extension).

Example 2

Figure 9:
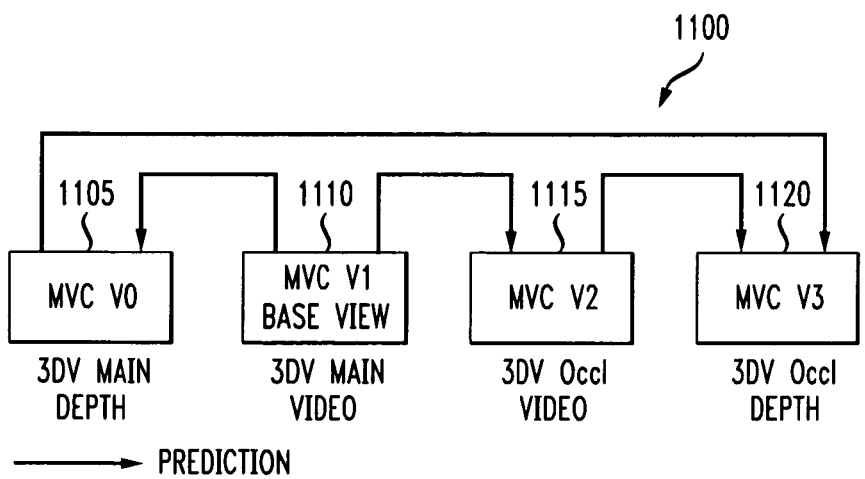
FIG. 9 is a diagram showing an example of encoding the LDV format in the MVC structure.

FIG. 9 is a diagram showing an example 1100 of encoding the LDV format in the MVC structure. There is only one 3DV view in this example. The 2D view is treated as the base view, which can be decoded by an AVC compatible decoder. view_id of the 2D view 1110 is 1. view_id of the depth map 1105, the occlusion video 1115, and the occlusion depth map 1120 are 0, 2, and 3, respectively. TABLE 3 shows an LDV example of a 3DV SEI message for MVC corresponding to Embodiment 1, Example 2.

TABLE 3

|  | Descriptor |
|---|---|
| three_dv_format( payloadSize ) { |  |
|   three_dv_format_id = 0 | ue(v) |
|   three_dv_format_cancel_flag = 0 | u(1) |
|   num_three_dv_view_minus1 = 0 | ue(v) |
|   basic_three_dv_format_type_id = 1 | ue(v) |
|     video_id[0] = 1 | u(10) |
|     depth_present_flag[0] = 1 | u(1) |
|     depth_id[0] = 0 | u(10) |
|     occlusion_video_present_flag[0] = 1 | u(1) |
|     occlusion_video_id[0] = 2 | u(10) |
|     occlusion_depth_present_flag[0] = 1 | u(1) |
|     occlusion_depth_id[0] = 3 | u(10) |
|   three_dv_format_repetition_period = 1 | ue(v) |
|   additional_extension_flag = 0 | u(1) |
| } |  |

Example 3

Figure 10:
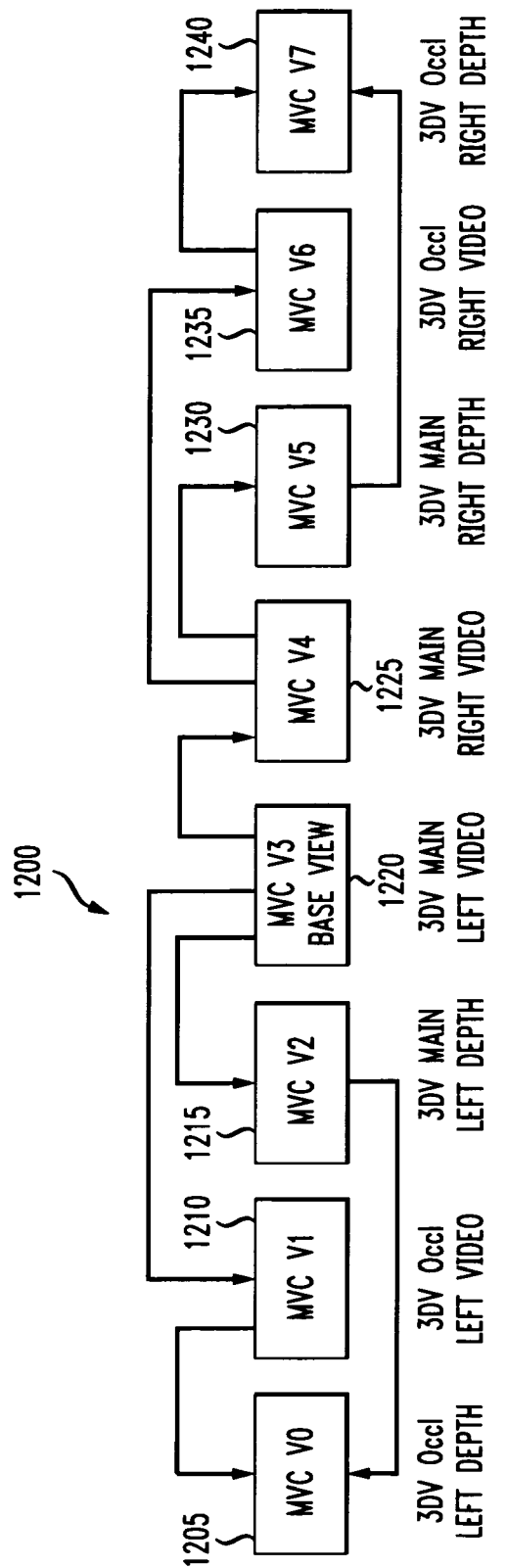
FIG. 10 is a diagram showing an example of encoding the DES format in the MVC structure.

FIG. 10 is a diagram showing an example 1200 of encoding the DES format in the MVC structure. There are two 3DV views in this example. The 2D view from the left is treated as the base view, which can be decoded by an AVC compatible decoder. view_id of the 2D view 1220 from left is 3. view_id of the depth map 1215, the occlusion video 1210, and the occlusion depth map 1205 from the left are 2, 1, and 0, respectively. view_id of the 2D view 1225, the depth map 1230, the occlusion video 1235, and the occlusion depth 1240 from the right are 4, 5, 6, and 7, respectively. TABLE 4 shows a DES example of a 3DV SEI message for MVC corresponding to Embodiment 1, Example 3.

TABLE 4

|  | Descriptor |
|---|---|
| three_dv_format( payloadSize ) { |  |
|   three_dv_format_id = 0 | ue(v) |
|   three_dv_format_cancel_flag = 0 | u(1) |
|   num_three_dv_view_minus1 = 1 | ue(v) |
|   basic_three_dv_format_type_id = 1 | ue(v) |
|     video_id[0] = 3 | u(10) |
|     depth_present_flag[0] = 1 | u(1) |
|     depth_id[0] = 2 | u(10) |
|     occlusion_video_present_flag[0] = 1 | u(1) |
|     occlusion_video_id[0] = 1 | u(10) |
|     occlusion_depth_present_flag[0] = 1 | u(1) |
|     occlusion_depth_id[0] = 0 | u(10) |
|     video_present_flag[1] = 1 | u(1) |
|     video_id[1] = 4 | u(10) |
|     depth_present_flag[1] = 1 | u(1) |

TABLE 4-continued

|  | Descriptor |
|---|---|
|     depth_id[1] = 5 | u(10) |
|     occlusion_video_present_flag[1] = 1 | u(1) |
|     occlusion_video_id[1] = 6 | u(10) |
|     occlusion_depth_present_flag[1] = 1 | u(1) |
|     occlusion_depth_id[1] = 7 | u(10) |
|   three_dv_format_repetition_period = 1 | ue(v) |
|   additional_extension_flag = 0 | u(1) |
| } | |

Note that in the above three examples, in addition to the 3DV views, some other views, which have only 2D video data, can be interleaved in the same bitstream. The decoder can still extract the correct 3DV views from the bitstream correctly. The additional views may be used, for example, to enhance the rendering quality at the receiver end.

Figure 11:
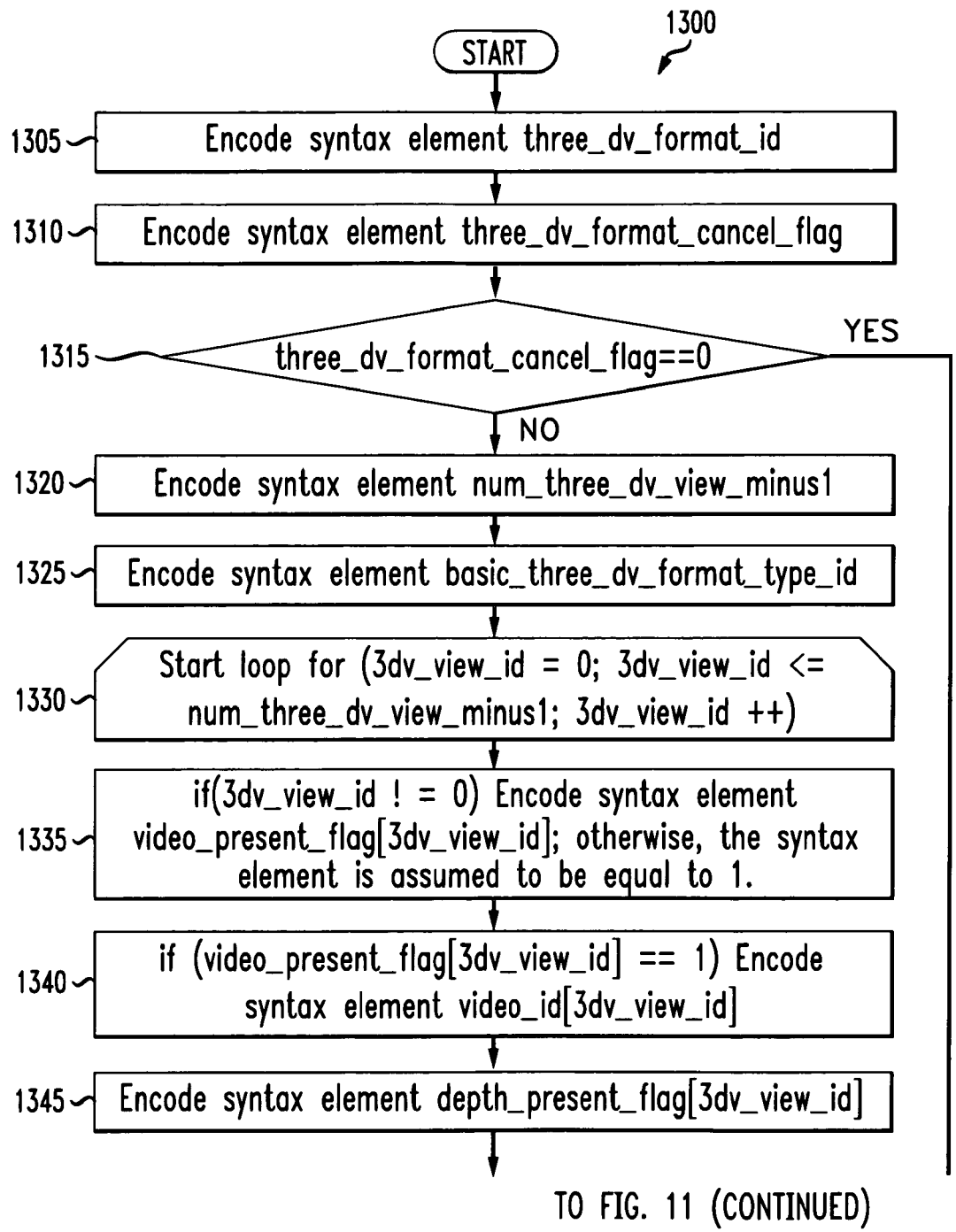
FIG. 11 is a diagram of an implementation of a first encoding process.
Figure 11:
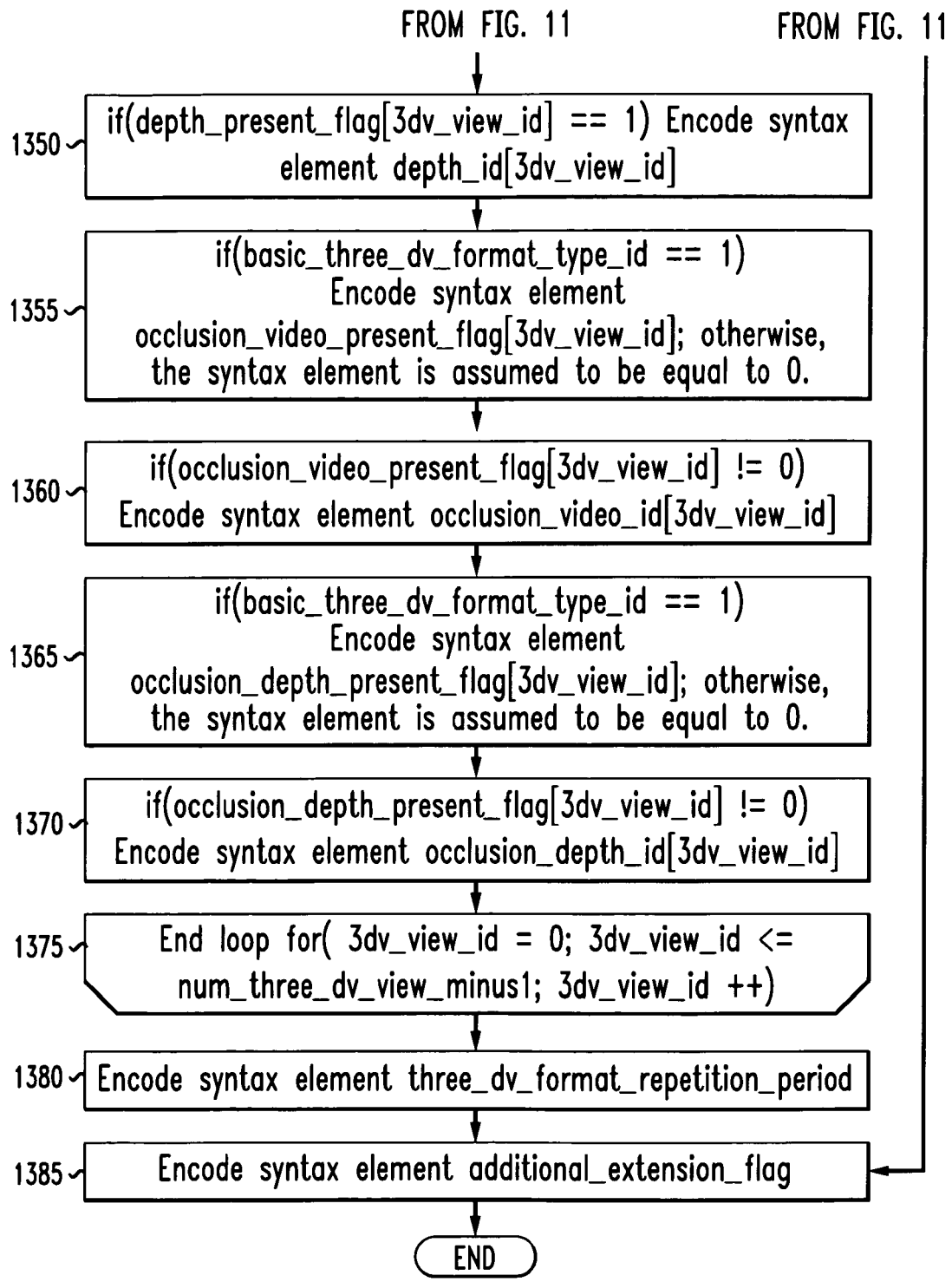

FIG. 11 is a flow diagram showing an exemplary method 1300 for encoding 3DV formats, in accordance with an embodiment of the present principles. FIG. 11 is directed to Embodiment 1, and collectively encompasses Examples 1 through 3 corresponding thereto. At step 1305, syntax element three_dv_format_id is encoded. At step 1310, syntax element three_dv_format_cancel_flag is encoded. At step 1315, it is determined whether or not three_dv_format_cancel_flag=0. If so, then control is passed to a step 1385. Otherwise, control is passed to a step 1320. At step 1320, the syntax element num_three_dv_view_minus1 is encoded. At step 1325, the syntax element basic_three_dv_format_type_id is encoded. At step 1330, a loop is commenced for 3dv_view_id=0; 3dv_view_id<=num_three_dv_view_minus1; and 3dv_view_id++. At step 1335, the syntax element video_present_flag[3dv_view_id] is encoded if 3dv_view_id!=0; otherwise, the syntax element 3dv_view_id is assumed to be equal to 1. At step 1340, the syntax element video_id[3dv_view_id] is encoded if video_present_flag[3dv_view_id]==1. At step 1345, the syntax element depth_present_flag[3dv_view_id] is encoded. At step 1350, the syntax element depth_id[3dv_view_id] is encoded if depth_present_flag[3dv_view_id]==1. At step 1355, the syntax element occlusion_video_present_flag[3dv_view_id] is encoded if basic_three_dv_format_type_id==1; otherwise, the syntax element basic_three_dv_format_type_id is assumed to be equal to 0. At step 1360, the syntax element occlusion_video_id[3dv_view_id] is encoded if occlusion_video_present_flag[3dv_view_id]!=0. At step 1365, the syntax element occlusion_depth_present_flag[3dv_view_id] is encoded if basic_three_dv_format==1; otherwise the syntax element basic_three_dv_format is assumed to be equal to 0. At step 1370, the syntax element occlusion_depth_id[3dv_view_id] is encoded if occlusion_depth_present_flag[3dv_view_id]!=0. At step 1375, the loop is ended for 3dv_view_id=0, 3dv_view_id<=num_three_dv_view_minus1, and 3dv_view_id++. At step 1380, the syntax element three_dv_format_repetition_period is encoded. At step 1385, the syntax element additional_extension_flag is encoded.

Figure 12:
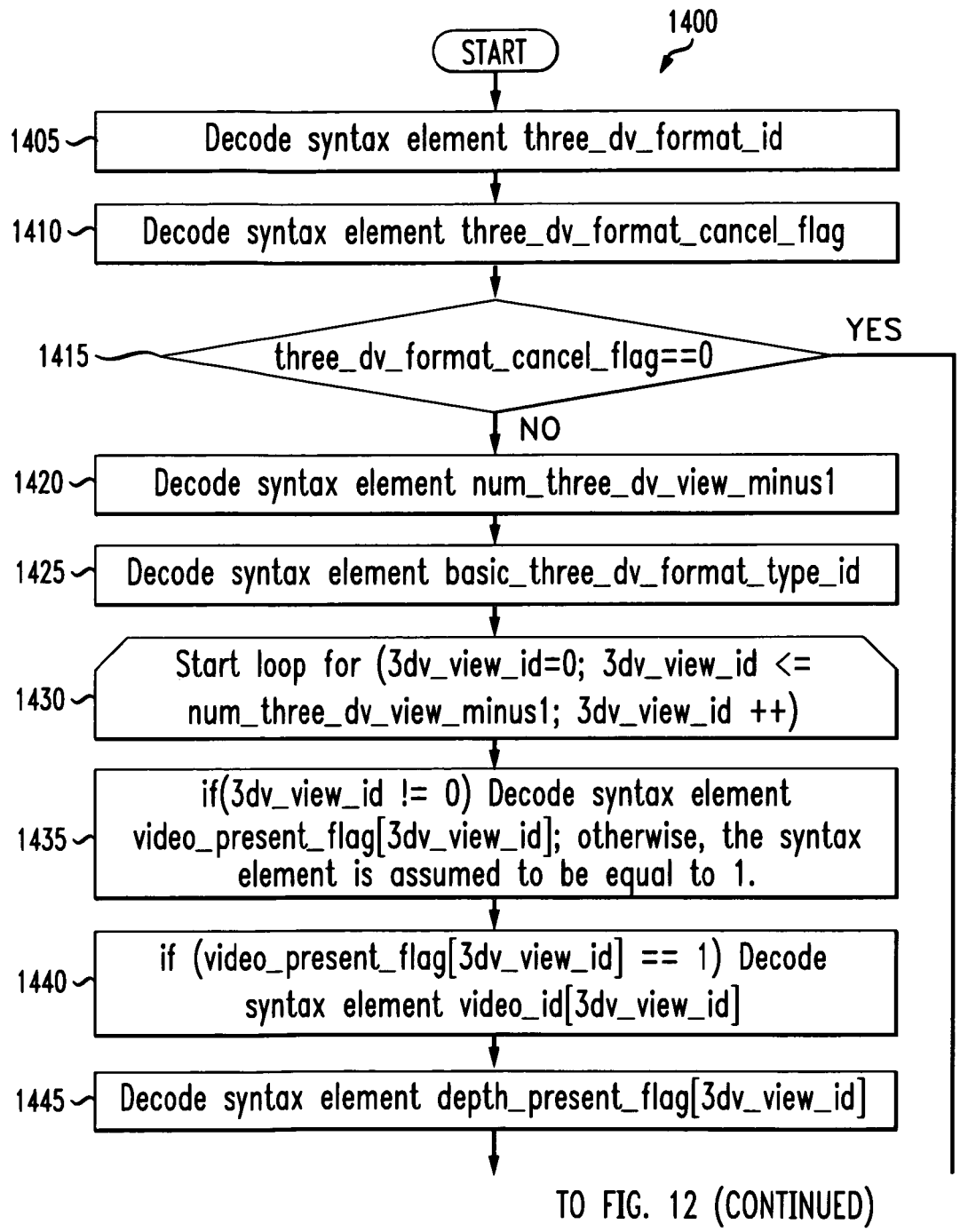
FIG. 12 is a diagram of an implementation of a first decoding process.
Figure 12:
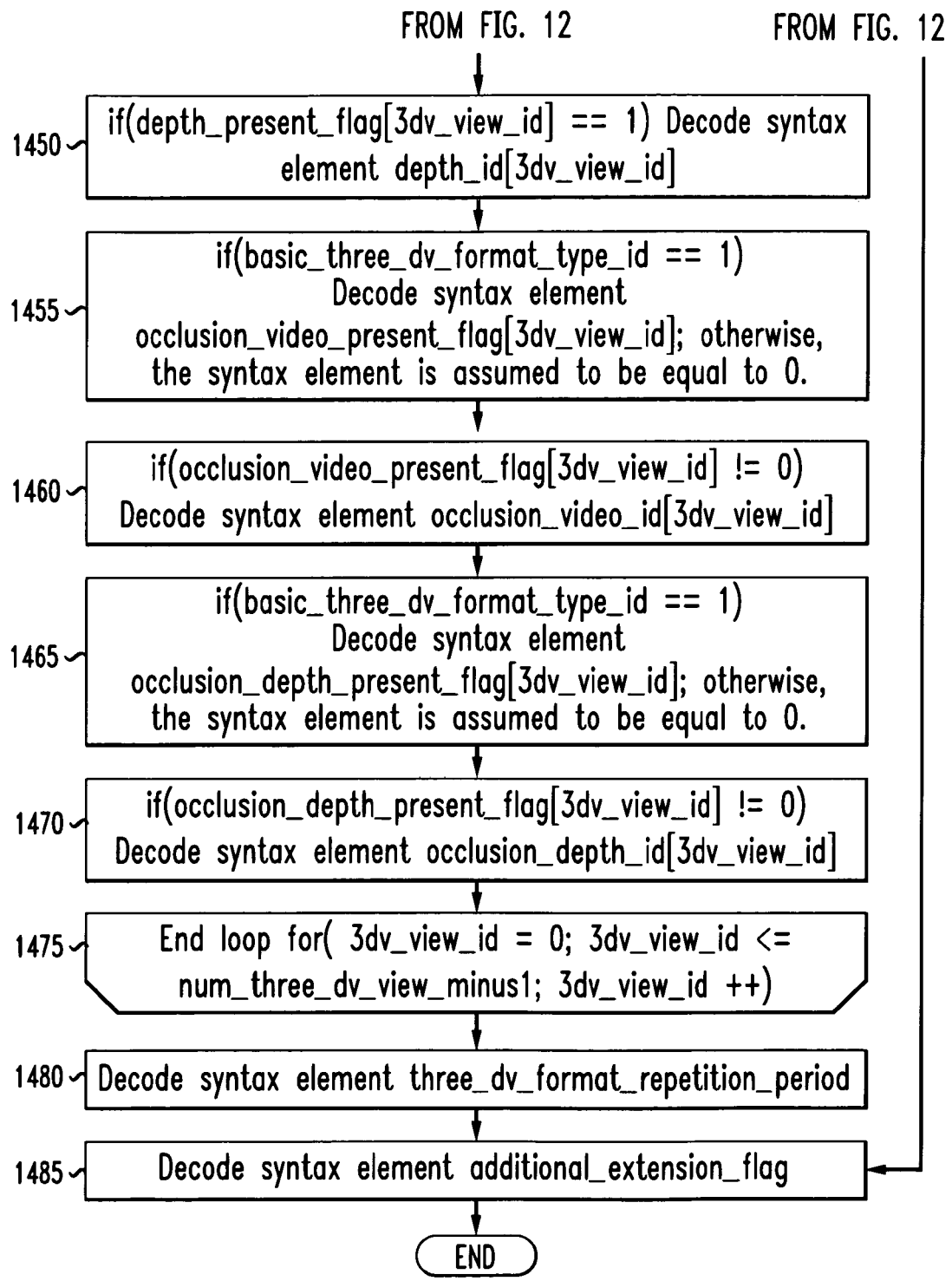

FIG. 12 is a flow diagram showing an exemplary method 1400 for decoding 3DV formats, in accordance with an embodiment of the present principles. FIG. 12 is directed to Embodiment 1, and collectively encompasses Examples 1 through 3 corresponding thereto. At step 1405, the syntax element three_dv_format_id is decoded. At step 1410, the syntax element three_dv_format_cancel_flag is decoded. At step 1415, it is determined whether or not three_dv_format_cancel_flag==0. If so, then control is passed to a step 1485. Otherwise, control is passed to a step 1420. At step 1420, the syntax element num_three_dv_view_minus1 is decoded. At step 1425, the syntax element basic_three_dv_format_type_id is decoded. At step 1430, a loop is started for 3dv_view_id=0, 3dv_view_id<=num_three_dv_view_minus1, and 3dv_view_id++. At step 1435, the syntax element video_present_flag[3dv_view_id] is decoded if 3dv_view_id!=0; otherwise, the syntax element 3dv_view_id is assumed to be equal to 1. At step 1440, the syntax element video_id[3dv_view_id] is decoded if video_present_flag[3dv_view_id]==1. At step 1445, the syntax element depth_present_flag[3dv_view_id] is decoded. At step 1450, the syntax element depth_id[3dv_view_id] is decoded if depth_present_flag[3dv_view_id]==1. At step 1455, the syntax element occlusion_video_present_flag[3dv_view_id] is decoded if basic_three_dv_format_type_id==1; otherwise, the syntax element basic_three_dv_format_type_id is assumed to be equal to 0. At step 1460, the syntax element occlusion_video_id[3dv_view_id] is decoded if occlusion_video_present_flag[3dv_view_id]!=0. At step 1465, the syntax element occlusion_depth_present_flag[3dv_view_id] is decoded if basic_three_dv_format_type_id==1; otherwise, the syntax element basic_three_dv_format_type_id is assumed to be equal to 0. At step 1470, the syntax element occlusion_depth_id[3dv_view_id] is decoded if occlusion_depth_present_flag[3dv_view_id]!=0. At step 1475, the loop is ended for 3dv_view_id=0, 3dv_view_id<=num_three_dv_view_minus1, and 3dv_view_id++. At step 1480, the syntax element three_dv_format_repetition_period is decoded. At step 1485, the syntax element additional_extension_flag is decoded.

Embodiment 2

Simplified 3DV Format SEI Message for MVC

Note that in another embodiment, it may be desired to map the view_id to 3dv_view_id in an implicit way and the syntax can be simplified from Embodiment 1. TABLE 5 shows a simplified 3DV format SEI message for MVC.

TABLE 5

|  | Descriptor |
|---|---|
| three_dv_format( payloadSize ) { | |
|   three_dv_format_id | ue(v) |
|   three_dv_format_cancel_flag | u(1) |
|   if( !three_dv_format_cancel_flag ) { | |
|     num_three_dv_view_minus1 | ue(v) |
|     basic_three_dv_format_type_id | ue(v) |
|     three_dv_format_repetition_period | ue(v) |
|   } | |
|   additional_extension_flag | u(1) |
| } | |

With the simplified SEI message, view_id's are mapped to 3dv_view_id's in the following implicit way. When basic_3dv_format_type_id is 0, view_id's in ascending order are mapped to 3dv_view_id's as shown in TABLE 6. When basic_3dv_format_type_id is 1, view_id's in ascending order are mapped to 3dv_view_id's as shown in TABLE 7.

TABLE 6

| view_id sorted in ascending order | 3dv_view_id |
|---|---|
| view_id (0) | 3dv_view_id = 0, 2D view |
| view_id (1) | 3dv_view_id = 0, Depth map |
| view_id (2) | 3dv_view_id = 1, 2D view |
| view_id (3) | 3dv_view_id = 1, Depth map |
| ... | ... |
| ... | ... |

TABLE 7

| view_id sorted in ascending order | 3dv_view_id |
|---|---|
| view_id (0) | 3dv_view_id = 0, 2D view |
| view_id (1) | 3dv_view_id = 0, Depth map |
| view_id (2) | 3dv_view_id = 0, Occlusion view |
| view_id (3) | 3dv_view_id = 0, Occlusion depth map |
| view_id (4) | 3dv_view_id = 1, 2D view |
| view_id (5) | 3dv_view_id = 1, Depth map |
| view_id (6) | 3dv_view_id = 1, Occlusion view |
| view_id (7) | 3dv_view_id = 1, Occlusion depth map |
| ... | ... |
| ... | ... |

Example 1

Figure 13:
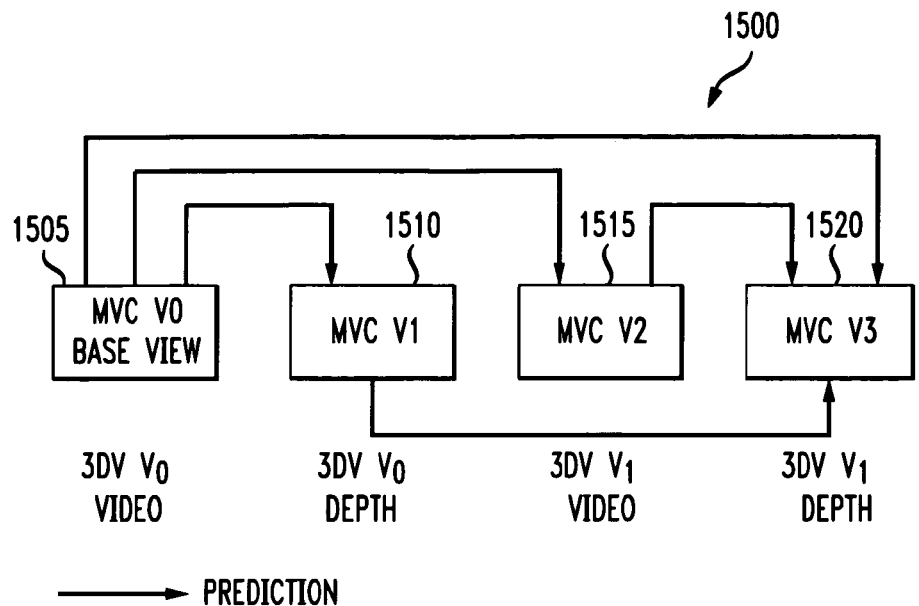
FIG. 13 is a diagram showing another example of encoding the MVD format in the MVC structure.

FIG. 13 is a diagram showing another example 1500 of encoding the MVD format in the MVC structure in which the mapping from view_id to 3dv_view_id of TABLE 6 is used. The numerals V0, V1, V2, and V3 respectively shown in the boxes 1505, 1510, 1515, and 1520 represent the corresponding view_id for that box. The corresponding 3dv_view_id for each box is respectively indicated below each box. The arrows point from a reference view to a view to be predicted. Box 1505 indicates the 2D video of the left view. Box 1510 indicates the depth of the left view. Box 1515 indicates the 2D video of the right view. Box 1520 indicates the depth of the right view.

Example 2

Figure 14:
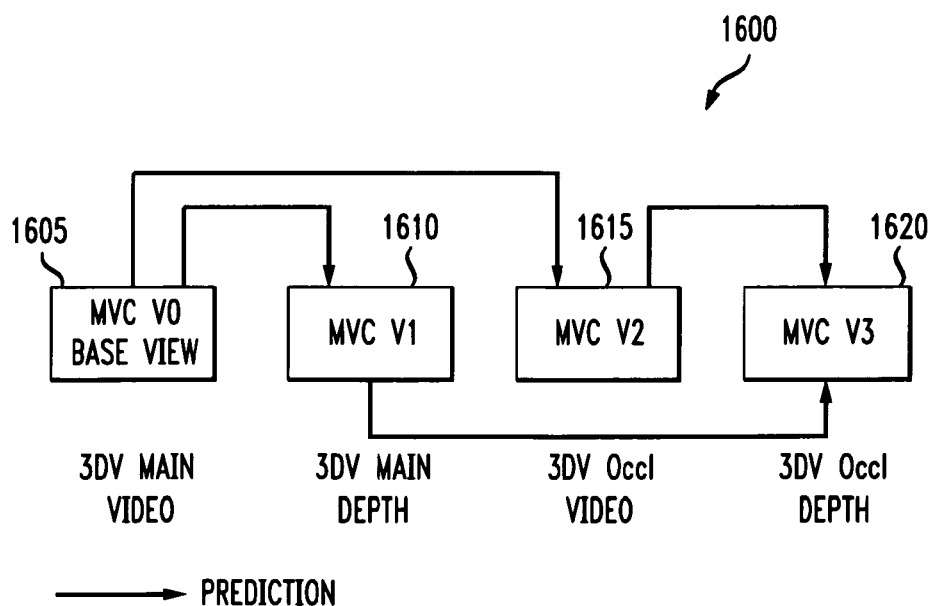
FIG. 14 is a diagram showing another example of encoding the LDV format in the MVC structure.

FIG. 14 is a diagram showing another example 1600 of encoding the LDV format in the MVC structure in which the mapping from view_id to 3dv_view_id of TABLE 7 is used. The numerals V0, V1, V2, and V3 respectively shown in the boxes 1605, 1610, 1615 and 1620 represent the corresponding view_id for that box. Below each box is an indication of the role of that box in the context of 3DV. The arrows point from a reference view to a view to be predicted. Box 1605 indicates the 2D video. Box 1610 indicates the corresponding depth. Box 1615 indicates the corresponding occlusion video. Box 1620 indicates the corresponding occlusion depth.

Example 3

Figure 15:
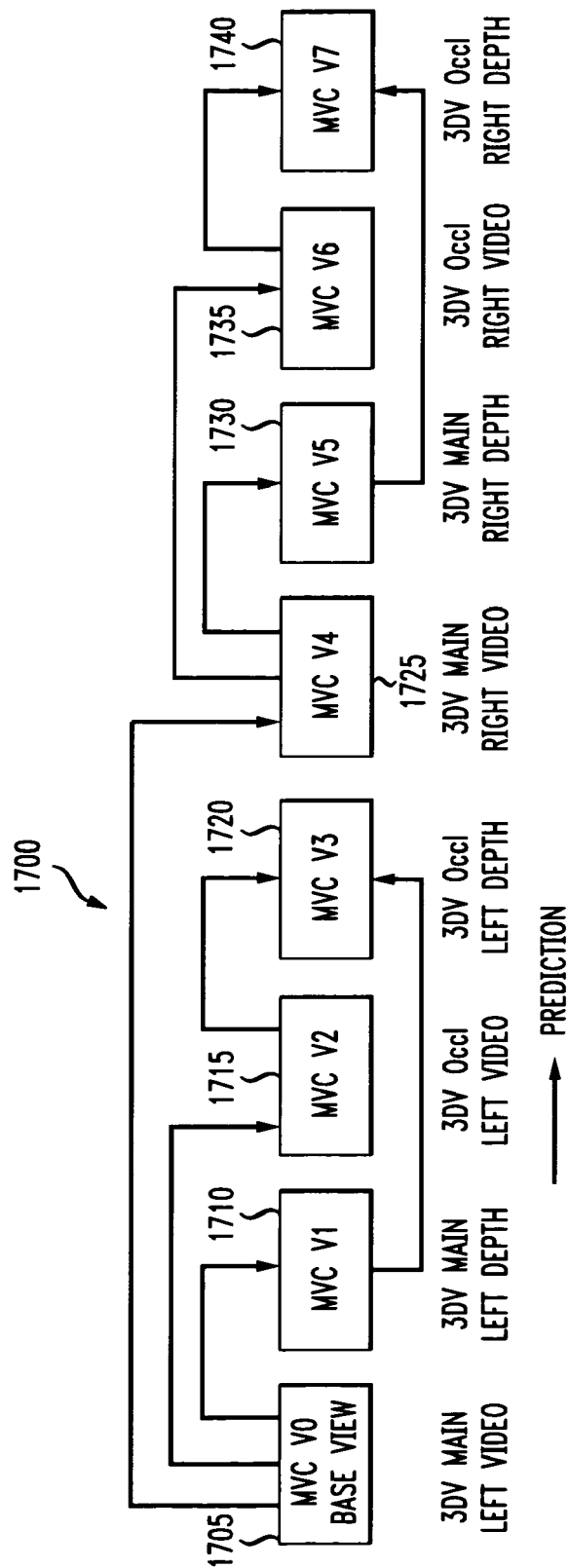
FIG. 15 is a diagram showing another example of encoding the DES format in the MVC structure.

FIG. 15 is a diagram showing another example 1700 of encoding the DES format in the MVC structure in which the mapping from view_id to 3dv_view_id of TABLE 7 is used. The numerals V0, V1, V2, V3, V4, V5, V6, and V7 respectively shown in boxes 1705, 1710, 1715, 1720, 1725, 1730, 1735 and 1740 represent the corresponding view_ id for that box. Below each box is an indication of the role of that box in the context of 3DV. The arrows point from a reference view to a view to be predicted. Box 1705 indicates the 2D video of the left view. Box 1710 indicates the corresponding depth of the left view. Box 1715 indicates the corresponding occlusion video of the left view. Box 1720 indicates the corresponding occlusion depth of the left view. Box 1725 indicates the 2D video of the right view. Box 1730 indicates the corresponding depth of the right view. Box 1735 indicates the corresponding occlusion video of the right view. Box 1740 indicates the corresponding occlusion depth of the right view.

Figure 16:
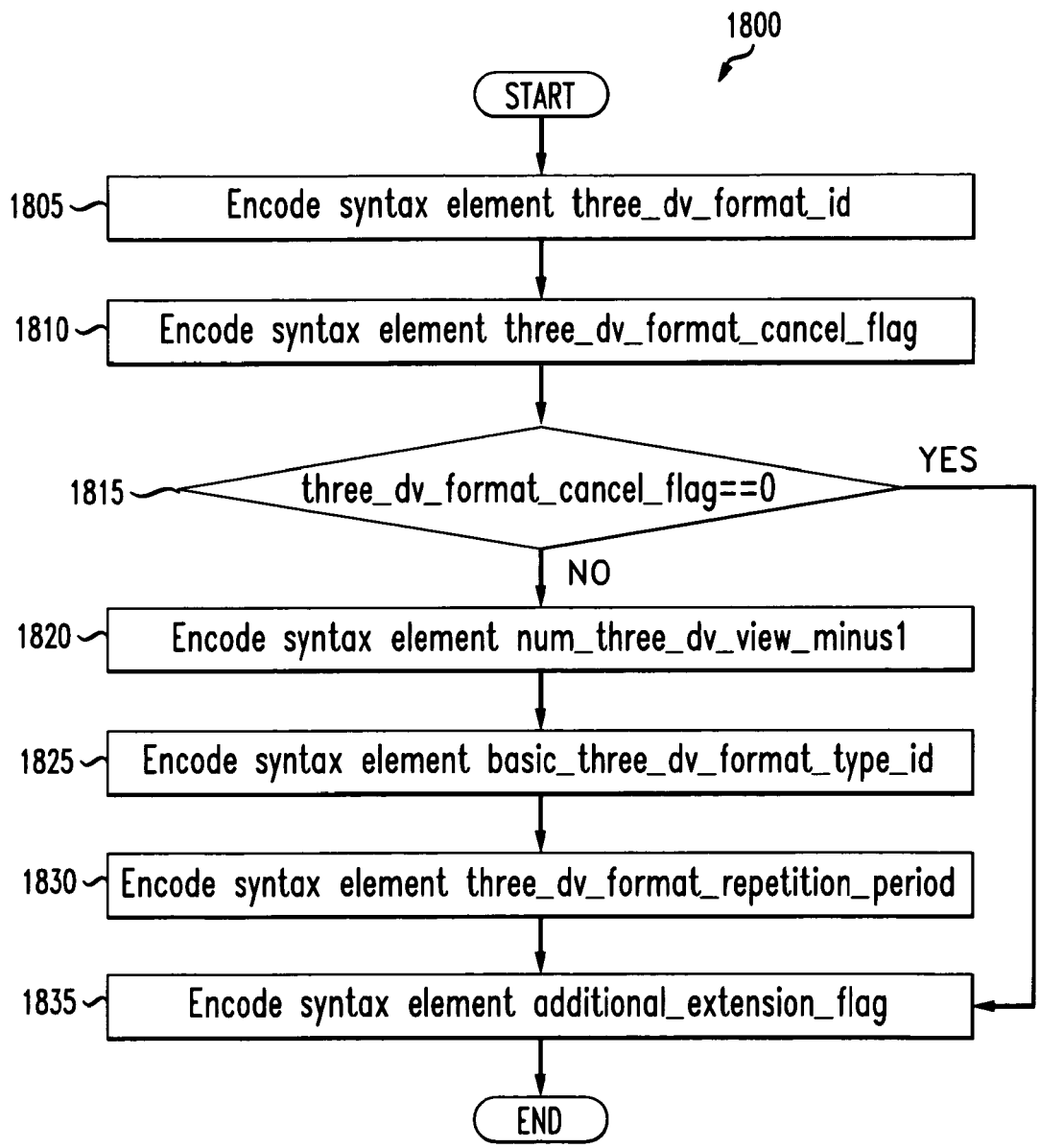
FIG. 16 is a diagram of an implementation of a second encoding process.

FIG. 16 is a flow diagram showing an exemplary method 1800 for encoding 3DV formats, in accordance with an embodiment of the present principles. FIG. 16 is directed to Embodiment 2, and collectively encompasses Examples 1 through 3 corresponding thereto. At step 1805, the syntax element three_dv_format_id is encoded. At step 1810, the syntax element three_dv_format_cancel_flag is encoded. At step 1815, it is determined whether or not three_dv_format_cancel_flag==0. If so, then control is passed to a step 1835. Otherwise, control is passed to a step 1820. At step 1820, the syntax element num_three_dv_view_minus1 is encoded. At step 1825 the syntax element basic_three_dv_format_type_id is encoded. At step 1830, the syntax element three_dv_ format_ repetition_period is encoded. At step 1835, the syntax element additional_extension_flag is encoded.

Figure 17:
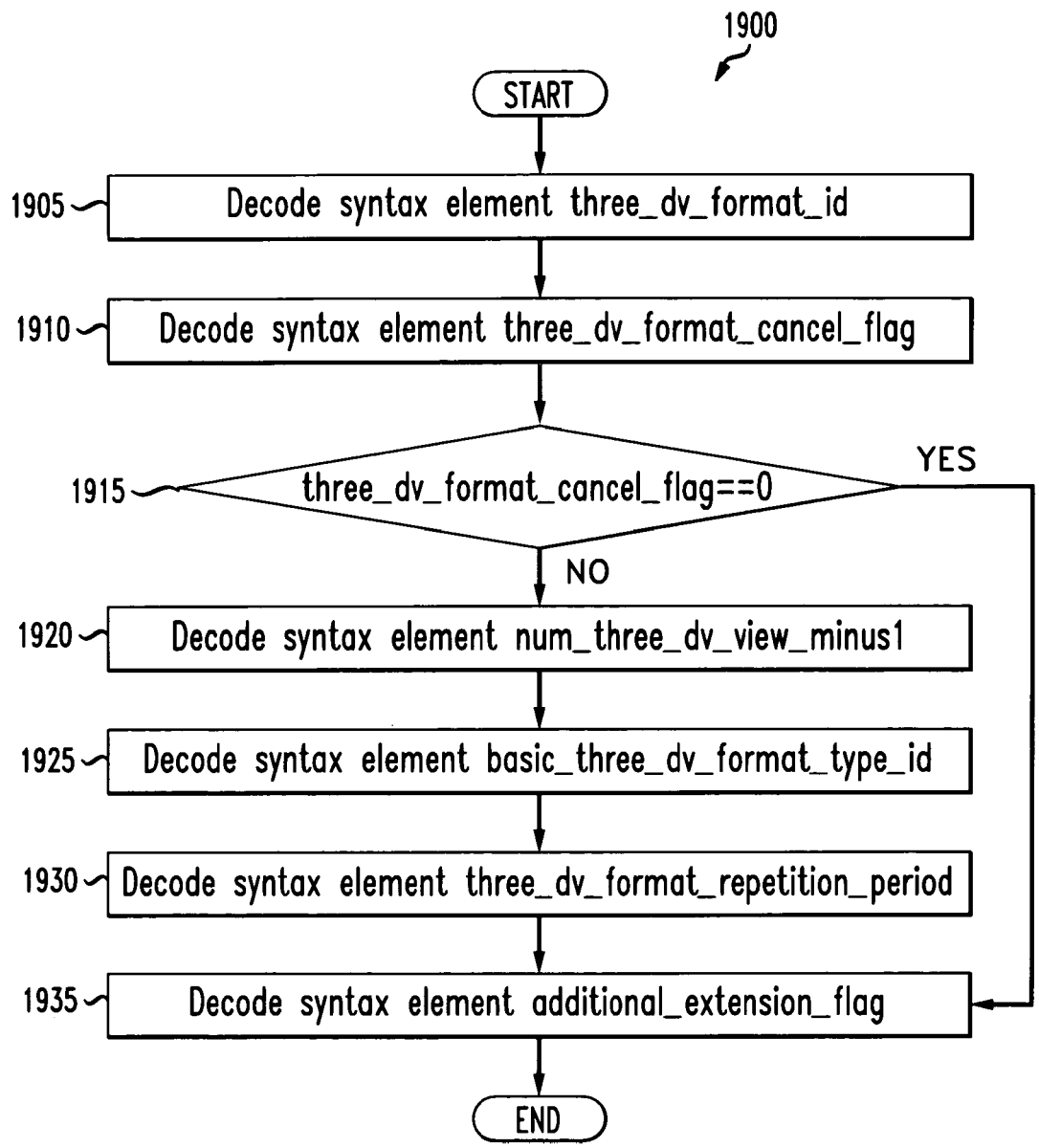
FIG. 17 is a diagram of an implementation of a second decoding process.

FIG. 17 is a flow diagram showing an exemplary method 1900 for decoding 3DV formats, in accordance with an embodiment of the present principles. FIG. 17 is directed to Embodiment 2, and collectively encompasses Examples 1 through 3 corresponding thereto. At step 1905, the syntax element three_dv_format_id is decoded. At step 1910, the syntax element three_dv_format_cancel_flag is decoded. At step 1915, it is determined whether or not three_dv_format_cancel_flag==0. If so, then control is passed to a step 1935. Otherwise, control is passed to a step 1920. At step 1920, the syntax element num_three_dv_view_minus1 is decoded. At step 1925, the syntax element basic_three_dv_format_type_id is decoded. At step 1930, the syntax element three_dv_ format_repetition_period is decoded. At step 1935, the syntax element additional_extension_flag is decoded.

Embodiment 3

3DV Format SEI for SVC

As another extension to AVC, SVC supports a layered coding structure so as to provide scalabilities in the temporal, spatial or quality domains. In this embodiment, we propose a 3DV format SEI message for SVC to signal the 3DV format, as shown in TABLE 8. One of the advantages of using SVC is that cross-layer prediction can be exploited to remove cross-component redundancy, for example, the redundancy between the motion in the video and the motion in the depth map.

TABLE 8

| | Descriptor |
|---|---|
| three_dv_format( payloadSize ) { | |
|   three_dv_format_id | ue(v) |
|   three_dv_format_cancel_flag | u(1) |
|   if( !three_dv_format_cancel_flag ) { | |
|     num_three_dv_view_minus1 | ue(v) |
|     basic_three_dv_format_type_id | ue(v) |
|     for( 3dv_view_id = 0; 3dv_view_id <= | |

TABLE 8-continued

| | Descriptor |
|---|---|
| num_three_dv_view_minus1; 3dv_view_id ++) { | |
|   if (3dv_view_id != 0) | |
|     video_present_flag[3dv_view_id] | u(1) |
|   else | |
|     video_present_flag[3dv_view_id] = 1 | |
|   if (video_present_flag[3dv_view_id]) { | |
|     video_dependency_id[3dv_view_id] | u(3) |
|     video_quality_id[3dv_view_id] | u(4) |
|     video_temporal_id[3dv_view_id] | u(3) |
|   } | |
|   depth_present_flag[3dv_view_id] | u(1) |
|   if (depth_present_flag[3dv_view_id]) { | |
|     depth_dependency_id[3dv_view_id] | u(3) |
|     depth_quality_id[3dv_view_id] | u(4) |
|     depth_temporal_id[3dv_view_id] | u(3) |
|   } | |
|   if (basic_three_dv_format_type_id == 1) | |
|     occlusion_video_present_flag[3dv_view_id] | u(1) |
|   else | |
|     occlusion_video_present_flag[3dv_view_id] = 0 | |
|   if (occlusion_video_present_flag[3dv_view_id]) { | |
|     occlusion_video_dependency_id[3dv_view_id] | u(3) |
|     occlusion_video_quality_id[3dv_view_id] | u(4) |
|     occlusion_video_temporal_id[3dv_view_id] | u(3) |
|   } | |
|   if (basic_three_dv_format_type_id == 1) | |
|     occlusion_depth_present_flag[3dv_view_id] | u(1) |
|   else | |
|     occlusion_depth_present_flag[3dv_view_id] = 0 | |
|   if (occlusion_depth_present_flag[3dv_view_id]) { | |
|     occlusion_depth_dependency_id[3dv_view_id] | u(3) |
|     occlusion_depth_quality_id[3dv_view_id] | u(4) |
|     occlusion_depth_temporal_id[3dv_view_id] | u(3) |
|   } | |
| } | |
| three_dv_format_repetition_period | ue(v) |
| } | |
| additional_extension_flag | u(1) |
| } | | video_present_flag[3dv_view_id] indicates whether the 2D video component is present for the current 3D view. A value of 1 indicates the presence of the 2D view component. A value of 0 indicates the absence of the 2D view component.

video_dependency_id[3dv_view_id], video_quality_id [3dv_view_id], and video_temporal_id[3dv_view_id] respectively indicate the dependency_id, quality_id, and temporal_id of the 2D view component sequence from a 3DV view with a specified 3dv_view_id. The respective definitions of dependency_id, quality_id and temporal_id are specified in H.264 Annex G.

depth_present_flag[3dv_view_id] indicates whether the depth map component is present for the current 3D view. A value of 1 indicates the presence of the depth map component. A value of 0 indicates the absence of the depth map component.

depth_dependency_id[3dv_view_id], depth_quality_id [3dv_view_id], and depth_temporal_id[3dv_view_id] respectively indicate the dependency_id, quality_id, and temporal_id of the depth map component sequence from a 3DV view with a specified 3dv_view_id. The respective definitions of dependency_id, quality_id and temporal_id are specified in H.264 Annex G.

occlusion_video_present_flag[3dv_view_id] indicates whether the occlusion video component is present for the current 3D view. A value of 1 indicates the presence of the occlusion video component. A value of 0 indicates the absence of the occlusion video component.

occlusion_video_dependency_id[3dv_view_id], occlusion_video_quality_id[3dv_view_id], and occlusion_ video_temporal_id[3dv_view_id] respectively indicate the dependency_id, quality_id, and temporal_id of the occlusion view component sequence from a 3DV view with a specified 3dv_view_id. The respective definitions of dependency_id, quality_id, and temporal_id are specified in H.264 Annex G.

occlusion_depth_present_flag[3dv_view_id] indicates whether the occlusion depth component is present for the current 3D view. A value of 1 indicates the presence of the occlusion depth component. A value of 0 indicates the absence of the occlusion depth component.

occlusion_depth_dependency_id[3dv_view_id], occlusion_depth_quality_id[3dv_view_id], and occlusion_depth_temporal_id[3dv_view_id] respectively indicate the dependency_id, quality_id, and temporal_id of the occlusion depth map component sequence from a 3DV view with a specified 3dv_view_id. The respective definitions of dependency_id, quality_id, and temporal_id are specified in H.264 Annex G.

Figure 18:
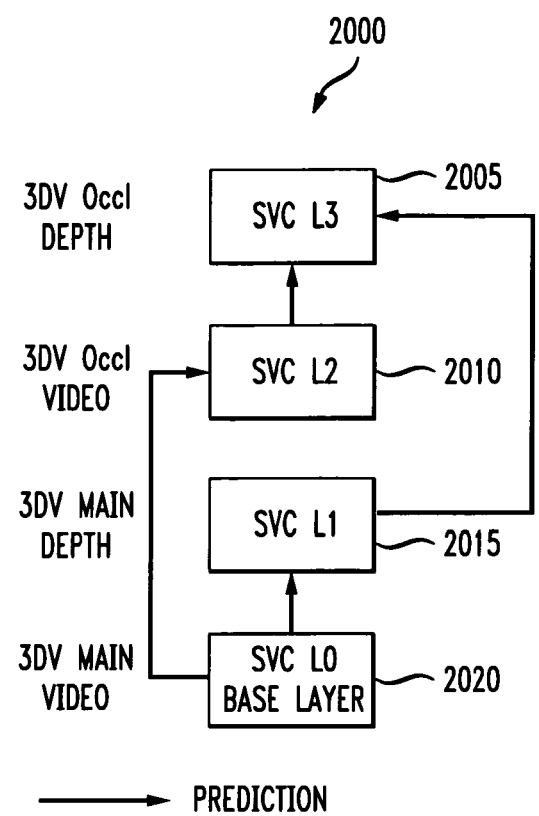
FIG. 18 is a diagram showing an example of encoding the LDV format in the SVC structure.

It is to be appreciated that all the three examples (relating to FIG. 8 through FIG. 10) listed in Embodiment 1 can be mapped to the SVC framework. For example, the LDV format can be implemented in SVC in FIG. 18, which corresponds to FIG. 9 in Embodiment 1. The numerals L3, L2, L1, and L0 respectively shown in boxes 2005, 2010, 2015 and 2020 represent the corresponding dependency_ id for that box. To the left of the boxes are the indication of the role in the context of 3DV. The arrows point from a reference layer to a layer to be predicted. Box 2020 indicates the 2D video. Box 2015 indicates the corresponding depth. Box 2010 indicates the corresponding occlusion video. Box 2005 indicates the corresponding occlusion depth.

TABLE 9 shows an example of a 3DV format SEI message for SVC, according to an embodiment of the present principles.

TABLE 9

| | Descriptor |
|---|---|
| three_dv_format( payloadSize ) { | |
|   three_dv_format_id = 0 | ue(v) |
|   three_dv_format_cancel_flag = 0 | u(1) |
|   num_three_dv_view_minus1 = 0 | ue(v) |
|   basic_three_dv_format_type_id = 1 | ue(v) |
|     video_dependency_id[0] = 0 | u(3) |
|     video_quality_id[0] = 0 | u(4) |
|     video_temporal_id[0] = 0 | u(3) |
|     depth_present_flag = 1 | u(1) |
|     depth_dependency_id[0] = 1 | u(3) |
|     depth_quality_id[0] = 0 | u(4) |
|     depth_temporal_id[0] = 0 | u(3) |
|     occlusion_video_present_flag = 1 | u(1) |
|     occlusion_video_dependency_id[0] = 2 | u(3) |
|     occlusion_video_quality_id[0] = 0 | u(4) |
|     occlusion_video_temporal_id[0] = 0 | u(3) |
|     occlusion_depth_present_flag = 1 | u(1) |
|     occlusion_depth_dependency_id[0] = 3 | u(3) |
|     occlusion_depth_quality_id[0] = 0 | u(4) |
|     occlusion_depth_temporal_id[0] = 0 | u(3) |
|   three_dv_format_repetition_period = 1 | ue(v) |
|   additional_extension_flag = 0 | u(1) |
| } | |

Figure 19:
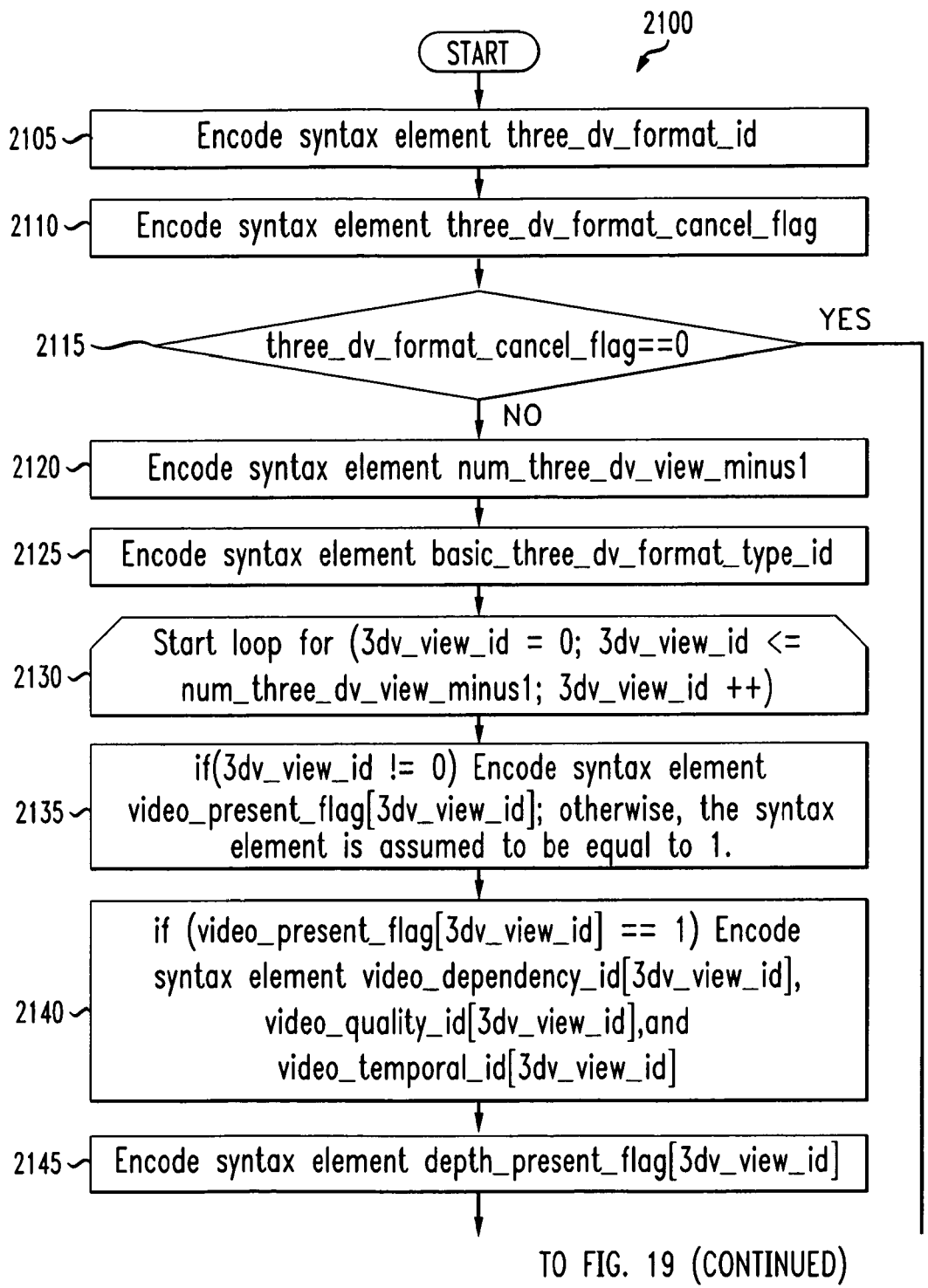
FIG. 19 is a diagram of an implementation of a third encoding process.
Figure 19:
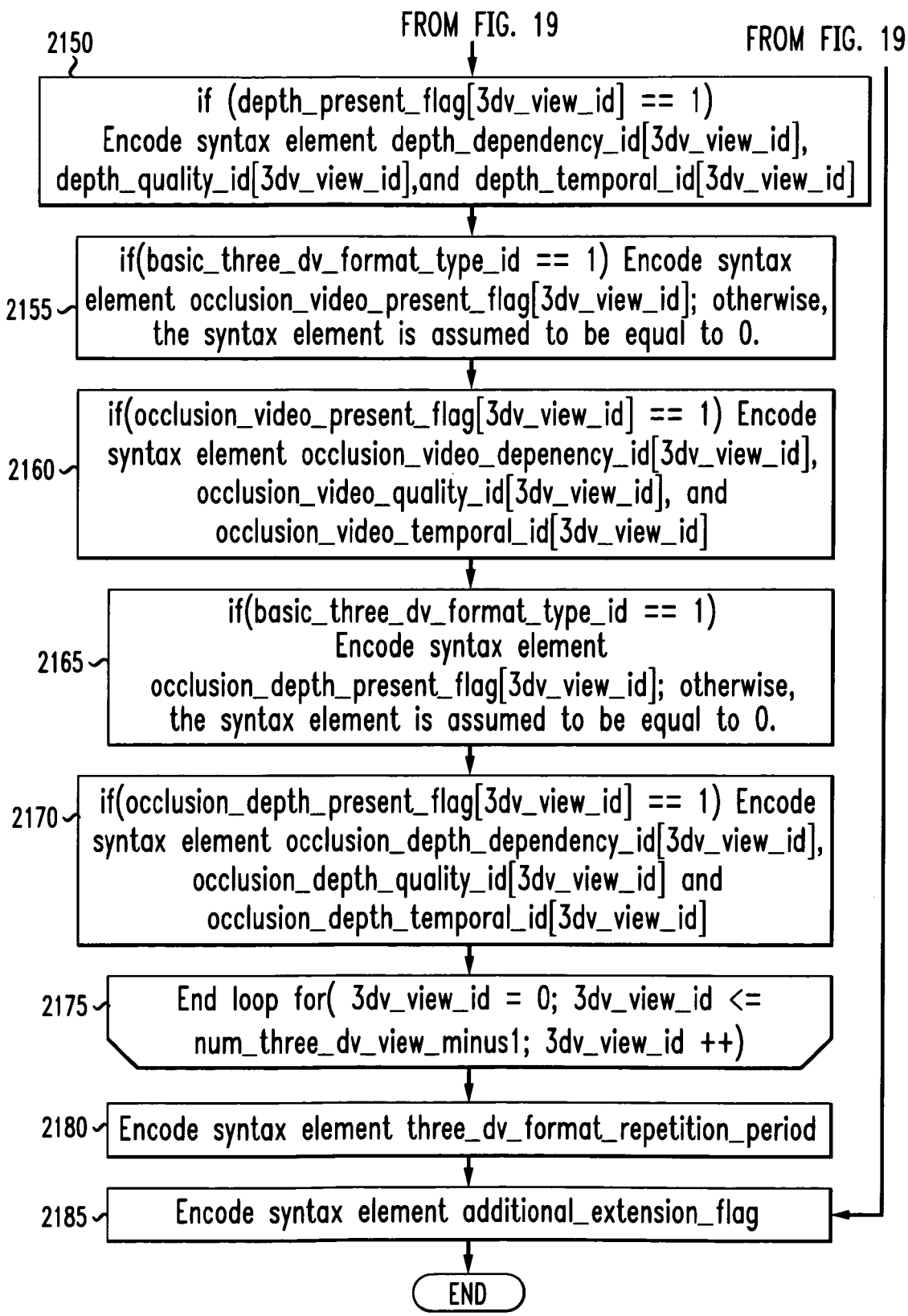

FIG. 19 is a flow diagram showing an exemplary method 2100 for encoding 3DV formats, in accordance with an embodiment of the present principles. FIG. 19 is directed to Embodiment 3. At step 2105, the syntax element three_dv_format_id is encoded. At step 2110, the syntax element three_dv_format_cancel_flag is encoded. At step 2115, it is determined whether or not three_dv_format_cancel_ flag==0. If so, then control is passed to a step 2185. Otherwise, control is passed to a step 2120. At step 2120, the syntax element num_three_dv_view_minus1 is encoded. At step 2125, the syntax element basic_three_dv_format_type_id is encoded. At step 2130, a loop is commenced for 3dv_view_id=0, 3DV_view_id<=num_three_dv_view_minus1, and 3dv_view_id++. At step 2135, the syntax element video_present_flag[3dv_view_id] is encoded if 3dv_view_id!=0; otherwise, the syntax element 3dv_view_id is assumed to be equal to 1. At step 2140, the syntax elements video_dependency_id[3dv_view_id], video_quality_id[3dv_view_id] and video_temporal_id[3dv_view_id] are encoded if video_present_flag[3dv_view_id]==1. At step 2145, the syntax element depth_present_flag[3dv_view_id] is encoded. At step 2150, the syntax elements depth_dependency_id[3dv_view_id], depth_quality_id[3dv_view_id], and depth_temporal_id[3dv_view_id] are encoded if depth_present_flag[3dv_view_id]==1. At step 2155, the syntax element occlusion_video_present_flag[3dv_view_id] is encoded if basic_three_dv_format_type_id==1; otherwise, the syntax element basic_three_dv_format_type_id is assumed to be equal to 0. At step 2160, the syntax elements occlusion_video_dependency_id[3dv_view_id], occlusion_video_quality_id[3dv_view_id], and occlusion_video_temporal_id[3dv_view_id] are encoded if occlusion_video_present_flag[3dv_view_id]==1. At step 2165, the syntax element occlusion_depth_present_flag[3dv_view_id] is encoded if basic_three_dv_format_type_id==1; otherwise, the syntax element occlusion_depth_present_flag[3dv_view_id] is assumed to be equal to 0. At step 2170, the syntax elements occlusion_depth_dependency_id[3dv_view_id], occlusion_depth_quality_id[3dv_view_id], and occlusion_depth_temporal_id[3dv_view_id] are encoded if occlusion_depth_present_flag[3dv_view_id]==1. At step 2175, the loop is ended for 3dv_view_id=0, 3dv_view_id<=num_three_dv_view_minus1, and 3dv_view_id++. At step 2180, the syntax element three_dv_format_repetition_ period is encoded. At step 2185, the syntax element additional_extension_flag is encoded.

Figure 20:
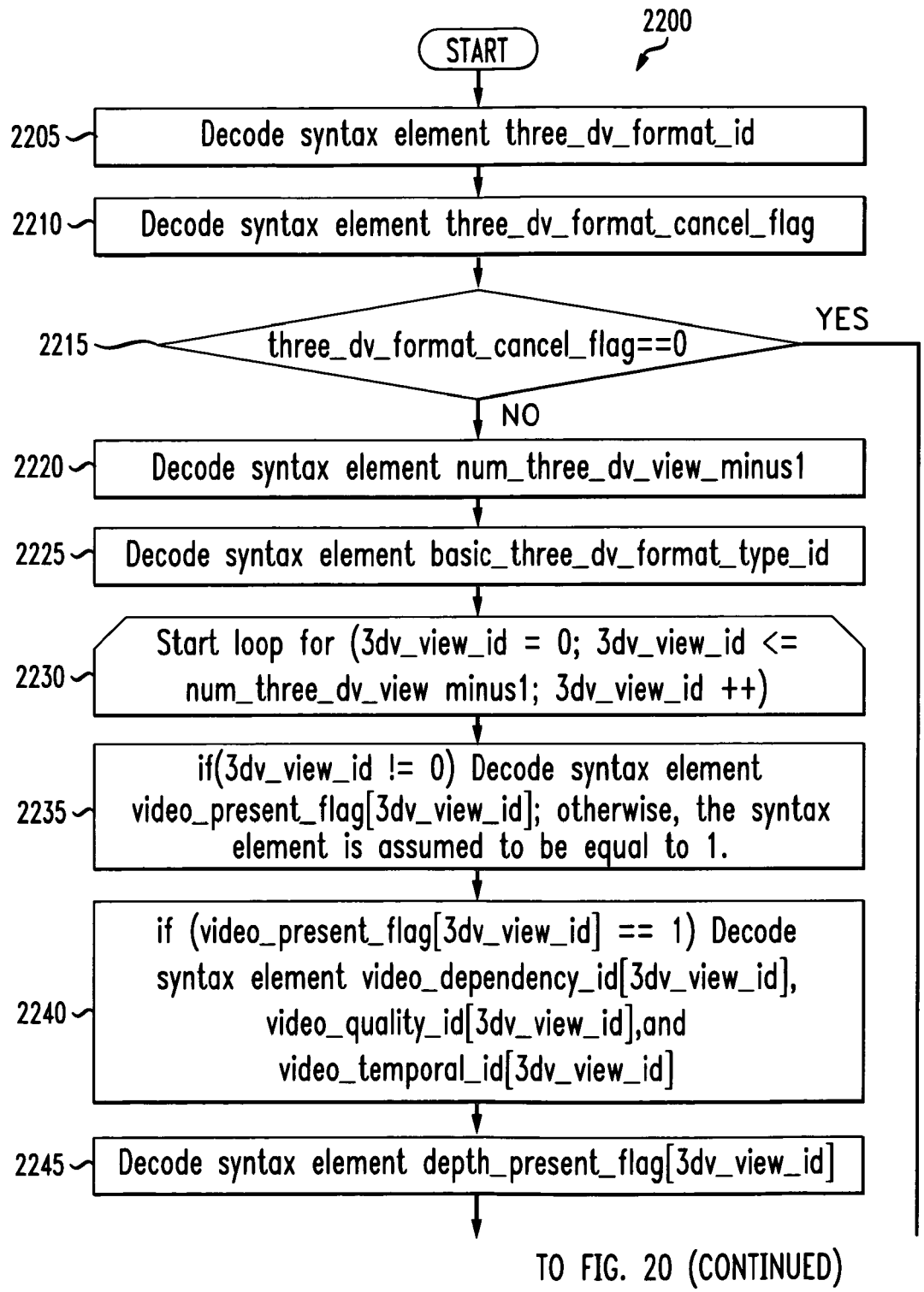
FIG. 20 is a diagram of an implementation of a third decoding process.
Figure 20:
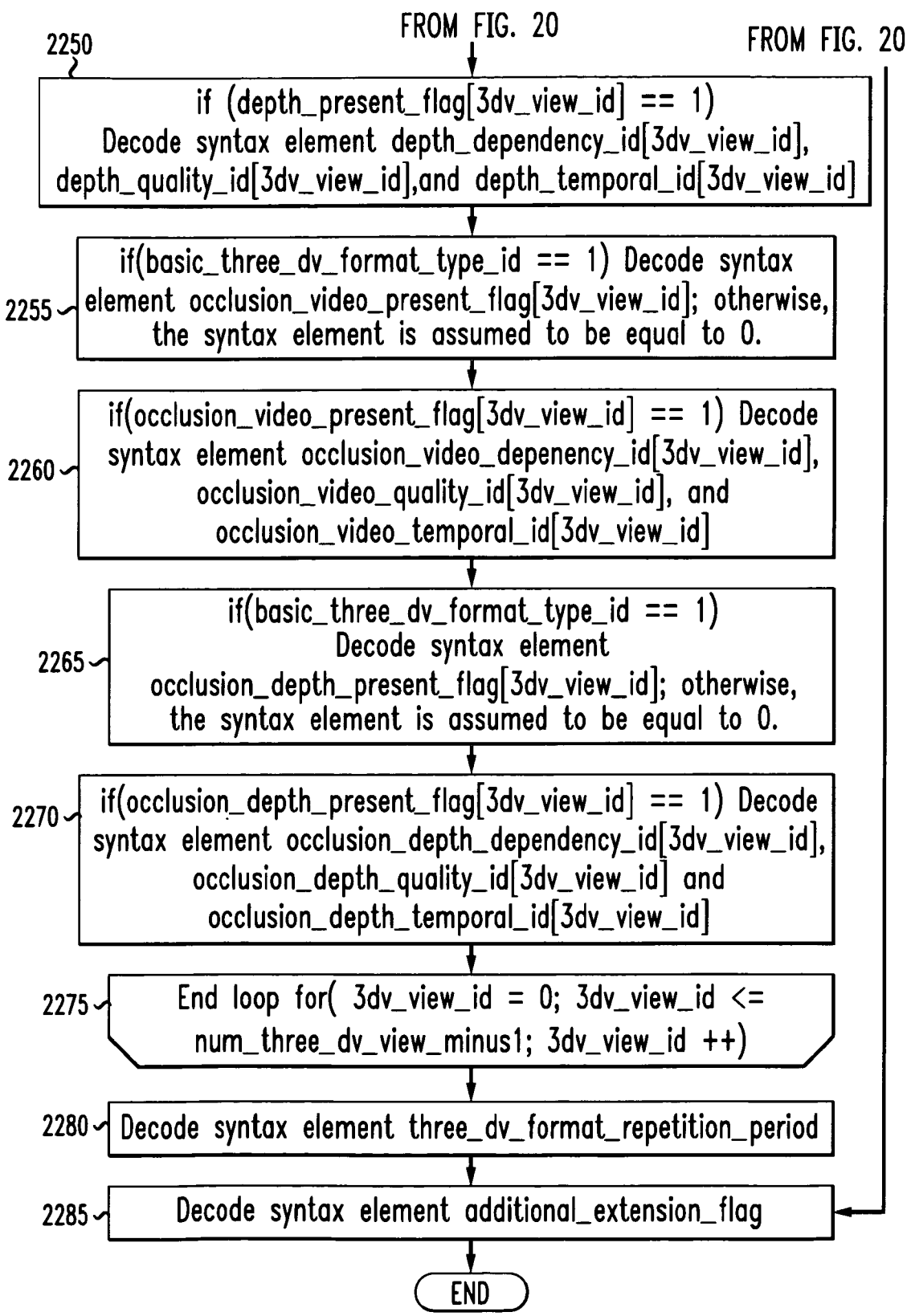

FIG. 20 is a flow diagram showing an exemplary method 2200 for decoding 3DV formats, in accordance with an embodiment of the present principles. FIG. 20 is directed to Embodiment 3. At step 2205, the syntax element three_dv_format_id is decoded. At step 2210, the syntax element three_dv_format_cancel_flag is decoded. At step 2215, it is determined whether or not three_dv_format_cancel_flag==0. If so, then control is passed to a step 2285. Otherwise, control is passed to a step 2120. At step 2220, the syntax element num_three_dv_view_minus1 is decoded. At step 2225, the syntax element basic_ three_ dv_ format_ type_ id is decoded. At step 2230, a loop is commenced for 3dv_view_id=0, 3DV_view_id<=num_three_dv_view_minus1, and 3dv_view_id++. At step 2235, the syntax element video_present_flag[3dv_view_id] is decoded if 3dv_view_id!=0; otherwise, the syntax element 3dv_view_id is assumed to be equal to 1. At step 2240, the syntax elements video_dependency_id[3dv_view_id], video_quality_id[3dv_view_id] and video_temporal_id[3dv_view_id] are decoded if video_present_flag[3dv_view_id]==1. At step 2245, the syntax element depth_present_flag[3dv_view_id] is decoded. At step 2250, the syntax elements depth_dependency_id[3dv_view_id], depth_quality_id[3dv_view_id], and depth_temporal_id[3dv_view_id] are decoded if depth_present_flag[3dv_view_id]==1. At step 2255, the syntax element occlusion_video_present_flag[3dv_view_id] is decoded if basic_three_dv_format_type_id==1; otherwise, the syntax element basic_three_dv_format_type_id is assumed to be equal to 0. At step 2260, the syntax elements occlusion_video_dependency_id[3dv_view_id], occlusion_video_quality_id[3dv_view_id], and occlusion_video_temporal_id[3dv_view_id] are decoded if occlusion_video_present_flag[3dv_view_id]==1. At step 2265, the syntax element occlusion_depth_present_flag[3dv_view_id] is decoded if basic_three_ dv_format_type_id==1; otherwise, the syntax element occlusion_depth_present_flag[3dv_view_id] is assumed to be equal to 0. At step 2270, the syntax elements occlusion_depth_dependency_id[3dv_view_id], occlusion_depth_quality_id[3dv_view_id], and occlusion_depth_temporal_id[3dv_view_id] are decoded if occlusion_depth_present_flag[3dv_view_id]==1. At step 2275, the loop is ended for 3dv_ view_id=0, 3dv_view_id<==num_three_dv_view_minus1, and 3dv_view_id++. At step 2280, the syntax element three_dv_format_repetition_period is decoded. At step 2285, the syntax element additional_extension_flag is decoded.

Embodiment 4

3DV Format SEI for SVC/MVC

In the previous three embodiments, each 3DV component is treated separately, either as a view in MVC or a layer in SVC. In this embodiment, it is proposed to do spatial interleaving on some 3DV components first, and then treat the spatial interleaved components as a view in MVC or a layer in SVC.

There may be a lot of different combinations in implementation. In the case of the MVD representation format, one example is to put the 2D and its depth side by side, then treat each 2D+Z image sequence as one view in MVC (or one layer in SVC). In another example, the two 2D images are arranged first side by side, and the two depth maps side by side also. Then, we treat the combined 2D image sequence as one view (or one layer) and treat the combined depth maps as another view (or another layer).

It is to be appreciated that given the teachings of the present principles provided herein, one of ordinary skill in this and related arts can readily extend the present principles to the LDV case with various corresponding implementations.

The spatial interleaving can be side-by-side, above-below, checkerboard, row-interleaving, column-interleaving, and so on.

The signaling methods of previous embodiments can also be applied or adapted to these embodiments.

Figure 21:
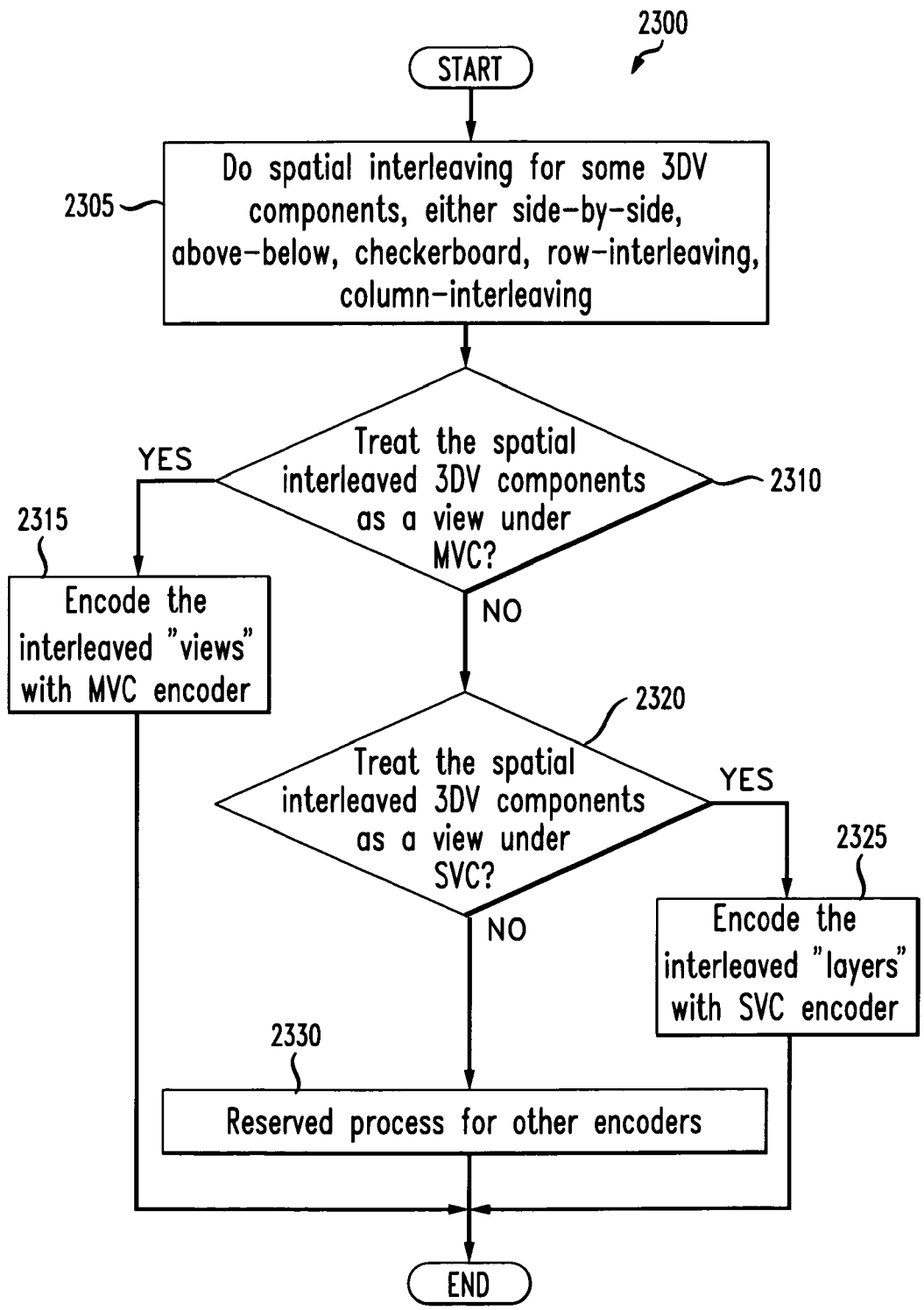
FIG. 21 is a diagram of an implementation of a fourth encoding process.

FIG. 21 is a flow diagram showing an exemplary method 2300 for encoding 3DV formats, in accordance with an embodiment of the present principles. FIG. 21 is directed to Embodiment 4. At step 2305, spatial interleaving is performed for some 3DV components, the spatial interleaving being, for example, either side-by-side, above-below, checkerboard, row-interleaving, or column-interleaving. At step 2310, it is determined whether or not the spatial interleaved 3DV components are to be treated as a view under MVC. If so, then control is passed to a step 2315. Otherwise, control is passed to a step 2320. At step 2315, the interleaved "views" are encoded with an MVC encoder. At step 2320, it is determined whether or not the spatial interleaved 3DV components are to be treated as a view under SVC. If so, then control is passed to a step block 2325. Otherwise, control is passed to a step 2330. At step 2325, the interleaved "layers" are encoded with an SVC encoder. At step 2330, the process is reserved for other encoders.

Figure 22:
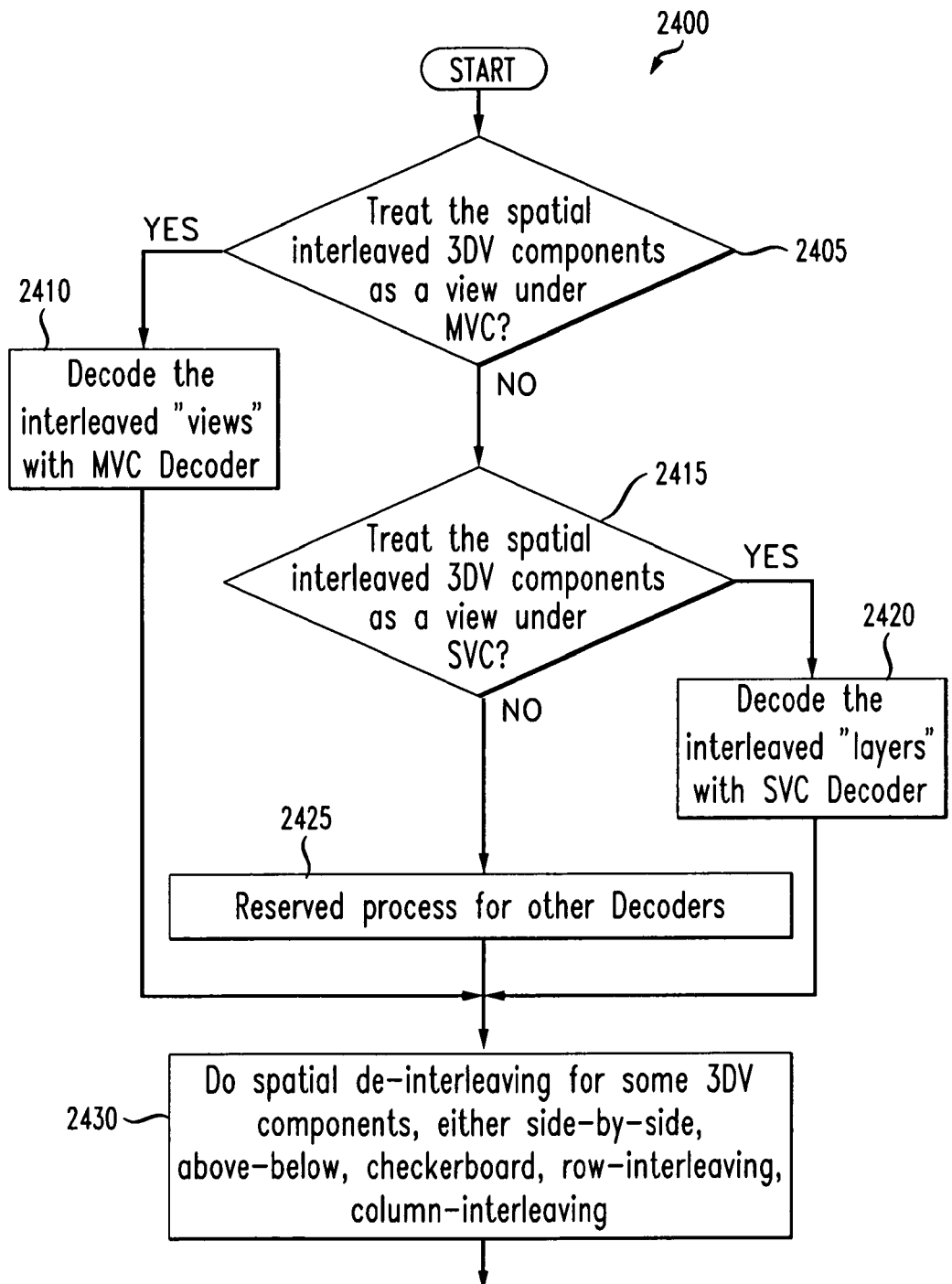
FIG. 22 is a diagram of an implementation of a fourth decoding process.

FIG. 22 is a flow diagram showing an exemplary method 2400 for decoding 3DV formats, in accordance with an embodiment of the present principles. FIG. 22 is directed to Embodiment 4. At step 2405, it is determined whether or not the spatial interleaved 3DV components are to be treated as a view under MVC. If so, then control is passed to a step 2410. Otherwise, control is passed to a step 2415. At step 2410, the interleaved "views" are decoded with an MVC decoder. At step 2415, it is determined whether or not the spatial interleaved 3DV components are to be treated as a view under SVC. If so, then control is passed to a step 2420. Otherwise, control is passed to a step 2425. At step 2420, the interleaved "layers" are decoded with an SVC decoder. At step 2425, the process is reserved for other decoders. At step 2430, spatial de-interleaving is performed for some 3DV components. The spatial de-interleaving is, for example, either side-by-side, above-below, checkerboard, row-interleaving, or column-interleaving.

We thus provide one or more implementations having particular features and aspects. However, features and aspects of described implementations may also be adapted for other implementations.

Additionally, the described implementations may be adapted in various ways. For example, implementations may expand the number of 3DV views and/or the number of 3DV format types provided for in the syntax and semantics of various described implementations. Additionally, implementations may perform prediction temporally. For example, a 3DV component may be predicted from a reference in the same 3DV component (as in FIG. 8, for example), a different 3DV component (as in FIG. 10's V4 in the right 3DV view being predicted from V3 in the left 3DV view, for example), and/or a different 3DV component occurring at a different point in time. For example, the left depth image 1005 of FIG. 8 can be predicted from a reference that is a left depth image from a previously occurring 3DV view.

Several of the implementations and features described in this application may be used in the context of the H.264/MPEG-4 AVC (AVC) Standard, or the AVC standard with the MVC extension, or the AVC standard with the SVC extension. However, these implementations and features may be used in the context of another standard (existing or future), or in a context that does not involve a standard. We thus provide one or more implementations having particular features and aspects. However, features and aspects of described implementations may also be adapted for other implementations.

Implementations may signal information using a variety of techniques including, but not limited to, SEI messages, slice headers, other high level syntax, non-high-level syntax, out-of-band information, datastream data, and implicit signaling. Accordingly, although implementations described herein may be described in a particular context, such descriptions should in no way be taken as limiting the features and concepts to such implementations or contexts.

Additionally, many implementations may be implemented in one or more of an encoder, a decoder, a post-processor processing output from a decoder, or a pre-processor providing input to an encoder. Further, other implementations are contemplated by this disclosure.

Reference in the specification to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C" and "at least one of A, B, or C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer, for example, to all or part (a portion) of a still image or all or part (a portion) of a picture from a video sequence. More generally, a picture refers, for example, to any set of image or video data. A picture may be, for example, a pixel, a macroblock, a slice, a frame, a field, a full picture, a region bounding an object in the picture, the foreground of the picture, the background of the picture, or a particular set of (x,y) coordinates in the picture. Similarly, a "portion" of a picture may be, for example, a pixel, a macroblock, a slice, a frame, a field, a region bounding an object in the picture, the foreground of the picture, the background of the picture, or a particular set of (x,y) coordinates in the picture. As another example, a depth picture (depth image) may be, for example, a complete depth map or a partial depth map that only includes depth information for, for example, a single macroblock of a corresponding video frame.

Additionally, this application or its claims may refer to "determining" various pieces of information. Determining the information may include one or more of, for example, estimating the information, calculating the information, predicting the information, or retrieving the information from memory.

Similarly, "accessing" is intended to be a broad term. Accessing a piece of information may include any operation that, for example, uses, stores, sends, transmits, receives, retrieves, modifies, or provides the information.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding and decoding. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Further, operations may be interchanged among functional blocks. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the following claims.

Similarly, it should be appreciated that in the above description of implementations various features are sometimes grouped together in a single implementation, figure, or description for the purpose of streamlining the disclosure and aiding in the understanding of one or more of the various aspects. This method of disclosure, however, is not to be interpreted as reflecting an intention that a claimed invention requires more features than are expressly recited in each claim. Rather, as the following claims reflect, inventive aspects may lie in less than all features of a single foregoing disclosed embodiment. Thus, it is understood that each of the claims also provides a separate implementation.

The invention claimed is:

1. A method comprising:
    encoding at least one set of 3D video components of a 3D video format in a layer-based structured bitstream, wherein each of the 3D video components is assigned to one layer of the layer-based structured bitstream, at least one layer of the layer-based structured bitstream being coded using one or more other layers as a reference;
    arranging the 3D video components of the at least one set of 3D video components in the layer-based structured bitstream in an order; and
    encoding of signaling information of the layer-based structured bitstream, the signaling information indicating the order,
    wherein the signaling information comprises a first syntax element indicating the 3D video format among at least:
        a first 3D video format wherein the 3D video components of the first 3D video format comprise the 2D video and corresponding depth components, and
        a second 3D video format wherein the 3D video components of the second 3D video format comprise the 2D video, corresponding depth components, 2D occlusion video component and corresponding depth occlusion video component,
    wherein the 3D video components of the at least one set of 3D video components are arranged in the layer-based structured bitstream:
        in a first order when the 3D video components of the set are in the first 3D video format, and
        in a second order when the 3D video components of the set are in the second 3D video format.

2. The method of claim 1, wherein the signaling information further comprises:
    a second syntax element indicating whether a first 3D video component of the set of 3D video components is present in the layer-based structured bitstream; and
    a third syntax element indicating a first layer in the bitstream which corresponds to the first 3D video component of a set of 3D video components which is present in the layer-based structured bitstream.

3. The method of claim 2, wherein the first 3D video component is a 2D video component of the set of 3D video components, a depth component corresponding to a 2D video component of the set of 3D video components, a 2D occlusion video component of the set of 2D video components or a depth occlusion video component corresponding to an occlusion video component of the set of 3D video components.

4. The method of claim 2, wherein the signaling information is included in an SEI message and the signaling information further comprises a fourth syntax element indicating whether the persistence of the indications provided by the first, second and/or third syntax elements in any previous SEI message in output order is canceled.

5. The method of claim 1, wherein the layer-based structured bitstream is compliant with a scalable video coding extension of a video coding standard.

6. An apparatus comprising one or more processors configured to perform at least:
encoding at least one set of 3D video components of a 3D video format in a layer-based structured bitstream,
wherein each of the 3D video components is assigned to one layer of the layer-based structured bitstream, at least one layer of the layer-based structured bitstream being coded using one or more other layers as a reference;
arranging the 3D video components of the at least one set of 3D video components in the layer-based structured bitstream in an order; and
encoding of signaling information of the layer-based structured bitstream, the signaling information indicating the order,
wherein the signaling information comprises a first syntax element indicating the 3D video format among at least:
a first 3D video format wherein the 3D video components of the first 3D video format comprise the 2D video and corresponding depth components, and
a second 3D video format wherein the 3D video components of the second 3D video format comprise the 2D video, corresponding depth components, 2D occlusion video component and corresponding depth occlusion video component,
wherein the 3D video components of the at least one set of 3D video components are arranged in the layer-based structured bitstream:
in a first order when the 3D video components of the set are in the first 3D video format, and
in a second order when the 3D video components of the set are in the second 3D video format.

7. The apparatus of claim 6, wherein the signaling information further comprises:
a second syntax element indicating whether a first 3D video component of the set of 3D video components is present in the layer-based structured bitstream; and
a third syntax element indicating a first layer in the bitstream which corresponds to the first 3D video component of a set of 3D video components which is present in the layer-based structured bitstream.

8. The apparatus of claim 7, wherein the signaling information is included in an SEI message and the signaling information further comprises a fourth syntax element indicating whether the persistence of the indications provided by the first, second and/or third syntax elements in any previous SEI message in output order is canceled.

9. The apparatus of claim 6, wherein the first 3D video component is a 2D video component of the set of 3D video components, a depth component corresponding to a 2D video component of the set of 3D video components, a 2D occlusion video component of the set of 2D video components or a depth occlusion video component corresponding to an occlusion video component of the set of 3D video components.

10. The apparatus of claim 6, wherein the layer-based structured bitstream is compliant with a scalable video coding extension of a video coding standard.

11. A method comprising:
accessing a layer-based structured bitstream, the layer-based structured bitstream including at least one set of 3D video components of a 3D video format, each of the 3D video components being assigned to one layer of the layer-based structured bitstream, at least one layer of the layer-based structured bitstream being coded using one or more other layers as a reference;
accessing signaling information of the layer-based structured bitstream, the signaling information indicating an order in which the 3D video components of the at least one set of 3D video components are arranged in the layer-based structured bitstream,
wherein the signaling information comprises a first syntax element indicating the 3D video format among at least:
a first 3D video format wherein the 3D video components of the first 3D video format comprise the 2D video and corresponding depth components, and
a second 3D video format wherein the 3D video components of the second 3D video format comprise the 2D video, corresponding depth components, 2D occlusion video component and corresponding depth occlusion video component,
wherein the 3D video components of the at least one set of 3D video components are arranged in the layer-based structured bitstream:
in a first order when the 3D video components of the set are in the first 3D video format, and
in a second order when the 3D video components of the set are in the second 3D video format; and
decoding the at least one set of 3D video components using the signaling information.

12. The method of claim 11, wherein the signaling information further comprises:
a second syntax element indicating whether a first 3D video component of the set of 3D video components is present in the layer-based structured bitstream; and
a third syntax element indicating a first layer in the layer-based structured bitstream which corresponds to the first 3D video component of the set of 3D video components which is present in the layer-based structured bitstream.

13. The method of claim 12, wherein the first 3D video component is a 2D video component of the set of 3D video components, a depth component corresponding to a 2D video component of the set of 3D video components, 2D occlusion video component of the set of 2D video components or a depth occlusion video component corresponding to an occlusion video component of the set of 3D video components.

14. The method of claim 12, wherein the signaling information is included in an SEI message and the signaling information further comprises a fourth syntax element indicating whether the persistence of the indications provided by the first, second and/or third syntax elements in any previous SEI message in output order is canceled.

15. The method of claim 11, wherein the signaling information is included in an SEI message.

16. The method of claim 11, wherein the layer-based structured bitstream is compliant with a scalable video coding extension of a video coding standard.

17. An apparatus comprising one or more processors configured to perform at least:
accessing a layer-based structured bitstream, the layer-based structured bitstream including at least one set of 3D video components of a 3D video format, each of the 3D video components being assigned to one layer of the layer-based structured bitstream, at least one layer of the layer- based structured bitstream being coded using one or more other layers as a reference;

accessing signaling information of the layer-based structured bitstream, the signaling information indicating an order in which the 3D video components of the at least one set of 3D video components are arranged in the layer-based structured bitstream,
wherein the signaling information comprises a first syntax element indicating the 3D video format among at least:
a first 3D video format wherein the 3D video components of the first 3D video format comprise the 2D video and corresponding depth components, and
a second 3D video format wherein the 3D video components of the second 3D video format comprise the 2D video, corresponding depth components, 2D occlusion video component and corresponding depth occlusion video component,
wherein the 3D video components of the at least one set of 3D video components are arranged in the layer-based structured bitstream:
in a first order when the 3D video components of the set are in the first 3D video format, and
in a second order when the 3D video components of the set are in the second 3D video format; and
decoding the at least one set of 3D video components using the signaling information.

18. The apparatus of claim 17, wherein the signaling information further comprises:
a second syntax element indicating whether a first 3D video component of the set of 3D video components is present in the layer-based structured bitstream; and
a third syntax element indicating a first layer in the layer-based structured bitstream which corresponds to the first 3D video component of a set of 3D video components which is present in the layer-based structured bitstream.

19. The apparatus of claim 18, wherein the first 3D video component is a 2D video component of the set of 3D video components, a depth component corresponding to a 2D video component of the set of 3D video components, 2D occlusion video component of the set of 2D video components or a depth occlusion video component corresponding to an occlusion video component of the set of 3D video components.

20. The apparatus of claim 18, wherein the signaling information is included in an SEI message and the signaling information further comprises a fourth syntax element indicating whether the persistence of the indications provided by the first, second and/or third syntax elements in any previous SEI message in output order is canceled.

21. The apparatus of claim 18, wherein the signaling information is included in an SEI message.

22. The apparatus of claim 18, wherein the layer-based structured bitstream is compliant with a scalable video coding extension of a video coding standard.

23. A non-transitory processor-readable medium having stored thereon instructions operative, when executed by a processor, to cause the a processor to:
access a layer-based structured bitstream, the layer-based structured bitstream including at least one set of 3D video components of a 3D video format, each of the 3D video components being assigned to one layer of the layer-based structured bitstream, at least one layer of the layer-based structured bitstream being coded using one or more other layers as a reference;
access signaling information of the layer-based structured bitstream, the signaling information indicating an order in which the 3D video components of the at least one set of 3D video components are arranged in the bitstream,
wherein the signaling information comprising a first syntax element indicating the 3D video format among at least:
a first 3D video format wherein the 3D video components of the first 3D video format comprise the 2D video and corresponding depth components, and
a second 3D video format wherein the 3D video components of the second 3D video format comprise the 2D video, corresponding depth components, 2D occlusion video component and corresponding depth occlusion video component,
wherein the 3D video components of the at least one set of 3D video components are arranged in the layer-based structured bitstream:
in a first order when the 3D video components of the set are in the first 3D video format, and
in a second order when the 3D video components of the set are in the second 3D video format; and
decode the at least one set of 3D video components using the signaling information.

24. The non-transitory processor-readable medium of claim 23, wherein the video signal further comprises:
a second syntax element indicating whether a first 3D video component of the set of 3D video components is present in the layer-based structured bitstream; and
a third syntax element indicating a first layer in the layer-based structured bitstream which corresponds to the first 3D video component of the set of 3D video components which is present in the layer-based structured bitstream.

25. The non-transitory processor-readable medium of claim 24, wherein the signaling information is included in an SEI message and the signaling information further comprises a fourth syntax element indicating whether the persistence of the indications provided by the first, second and/or third syntax elements in any previous SEI message in output order is canceled.

26. The non-transitory processor-readable medium of claim 24, wherein the first 3D video component is a 2D video of the set of 3D video components, a depth component corresponding to a 2D video of the set of 3D video components, 2D occlusion video component of the set of 2D video components or a depth occlusion video component corresponding to an occlusion video component of the set of 3D video components.

27. A non-transitory processor-readable medium having stored thereon a video signal structure, the video signal comprising a signaling section including signaling information indicating an order in which 3D video components of at least one set of 3D video components of a 3D video format are arranged in a layer-based structured bitstream,
wherein the signaling information comprises a first syntax element indicating the 3D video format among at least:
a first 3D video format wherein the 3D video components of the first 3D video format comprise the 2D video and corresponding depth components, and
a second 3D video format wherein the 3D video components of the second 3D video format comprise the 2D video, corresponding depth components, 2D occlusion video component and corresponding depth occlusion video component,
wherein the 3D video components of the at least one set of 3D video components are arranged in the layer-based structured bitstream:

in a first order when the 3D video components of the set are in the first 3D video format, and in a second order when the 3D video components of the set are in the second 3D video format, each of the 3D video components being assigned to one layer of the layer-based structured bitstream, one or more layers being capable of being used as a reference for at least one other layer to exploit redundancy there between.

28. The non-transitory processor-readable medium of claim 27, wherein the video signal further comprises:
 a second syntax element indicating whether a first 3D video component of the set of 3D video components is present in the layer-based structured bitstream; and
 a third syntax element indicating a first layer in the layer-based structured bitstream which corresponds to the first 3D video component of the set of 3D video components which is present in the layer-based structured bitstream.

29. The non-transitory processor-readable medium of claim 28, wherein the signaling information is included in an SEI message and the signaling information further comprises a fourth syntax element indicating whether the persistence of the indications provided by the first, second and/or third syntax elements in any previous SEI message in output order is canceled.

30. The non-transitory processor-readable medium of claim 27, wherein the first 3D video component is a 2D video of the set of 3D video components, a depth component corresponding to a 2D video of the set of 3D video components, 2D occlusion video component of the set of 2D video components or a depth occlusion video component corresponding to an occlusion video component of the set of 3D video components.

* * * * *